US006427148B1

(12) United States Patent
Cossock

(10) Patent No.: US 6,427,148 B1
(45) Date of Patent: Jul. 30, 2002

(54) METHOD AND APPARATUS FOR PARALLEL SORTING USING PARALLEL SELECTION/PARTITIONING

(75) Inventor: David Cossock, Berkeley, CA (US)

(73) Assignee: Compaq Computer Corporation, Cupertino, CA (US)

( * ) Notice: Subject to any disclaimer, the term of this patent is extended or adjusted under 35 U.S.C. 154(b) by 0 days.

(21) Appl. No.: 09/188,870

(22) Filed: Nov. 9, 1998

(51) Int. Cl.[7] .................................................. G06F 7/16

(52) U.S. Cl. .......................... 707/7; 709/100; 709/107

(58) Field of Search ............................... 707/7, 102, 3, 707/5, 100, 101, 501; 709/100

(56) References Cited

U.S. PATENT DOCUMENTS

| 5,210,870 A | 5/1993 | Baum et al. ................. 395/600 |
| 5,287,494 A | 2/1994 | Garcia et al. ................ 395/600 |
| 5,355,478 A | 10/1994 | Brady et al. ................. 395/600 |
| 5,487,166 A | 1/1996 | Cossock ....................... 395/600 |
| 5,852,826 A | * 12/1998 | Graunke et al. ................ 707/7 |
| 6,003,036 A | * 12/1999 | Martin ......................... 707/102 |

OTHER PUBLICATIONS

Guy E. Blelloch, C. Greg Plaxton, Charles E. Leiserson, Stephen J. Smith, Bruce M. Maggs and Marco Zagha, "A Comparison of Sorting Algorithms for the Connection Machine CM-2," © 1991 ACM, pp. 3–16.

Web article by Sandia National Laboratories entitled: "'Fastest sorting machine known . . . ' Sandia and Compaq together set world record in large database sorting", published by Sandia National Laboratories–News Releases, Nov. 10, 1998, http://www.sandia.gov/media/sort.htm, pp. 1–4.

Web article by Compaq entitled: "Compaq and Sandia Labs Shatter Performance Record with 72–Node Industry–Standard Cluster", published by Compaq–Newsroom, Nov. 10, 1998, http://www.compaq.com/newsroom/pr/pr101198b.html, pp. 1–3.

Tom Leighton, "Tight Bounds on the Complexity of Parallel Sorting," Apr. 1985, IEEE Transactions on Computers, vol. c–24, No. 4, pp. 344–354.

Bülent Abali, Füsun Özgüner and Abdulla Bataineh, "Balance Parallel Sort on Hypercube Multiprocessors," May 1993, IEEE Transactions on Parallel and Distributed Systems, vol. 4, No. 5, pp. 572–581.

Richard John Cole, "An Optimally Efficient Selection Algorithm." Jan. 25, 1988, Information Processing Letters 26 (1987/88), pp. 295–299.

Alok Aggarwal and C. Greg Plaxton, "Optimal Parallel Sorting in Multi–Level Storage," Department of Computer Sciences, The University of Texas at Austin, Mathematical Sciences Library, Stanford University, Stanford, CA 94305, pp. 1–23.

(List continued on next page.)

Primary Examiner—Majid A. Banankhah
(74) Attorney, Agent, or Firm—Fenwick & West LLP

(57) ABSTRACT

An embodiment of the present invention provides a method and apparatus for sorting very large data sets using a parallel merge sort. Given sorted work files $S_1, \ldots, S_p$, produced by P processes, the described embodiment of the method effectively implements a parallel merge onto respective output partitions $O_1, \ldots, O_p$, of the processes P. Because each of these output partitions O has a finite size, the invention must quickly determine "splitting keys" for each output partition O in such a way that the data in the work files will be split between the multiple output partitions O without overrunning the size of any of the partitions O. Once the splitting keys for each partition are determined, the processes exchange data so that the output partitions of each process contains data between the splitting keys associated with that output partition.

20 Claims, 22 Drawing Sheets

OTHER PUBLICATIONS

C. Greg Plaxton, "On The Network Complexity of Selection," Aug. 1989, Report No. STAN–CS–89–1276, Mathematical Sciences Library, Stanford University, Stanford, CA 94305, Department of Computer Science, pp. 1–17.

Uzi Vishkin, "An Optimal Parallel Algorithm for Selection," Dec. 1983, Department of Computer Science, Courant Institute of Mathematical Sciences, New York University, Ultra Computer Note 64, Technical Report 106, 10–page article.

P. Berthomé, A. Ferreira, B. M. Maggs, S. Perennes and C.G. Plaxton, "Sorting–Based Selection Algorithms for Hypercubic Networks," $7^{th}$ Internationa Parallel Processing Symposium, Apr. 13–16, 1993, Newport Beach, California, pp. 89–95.

Micah Akler, John w. Byers and Richard M. Karp, "Parallel Sorting With Limited Bandwidth," International Computer Science Institute and Computer Science Division, UC Berkeley, SPAA '95, $7^{th}$ Annual ACM Symposium on Parallel Algorithms and Architectures, Jul. 17–19, 1995, pp. 129–136.

Michael Ian Shamos, "Geometry and Statistics: Problems at the Interface," Departments of Computer Science and Mathematics, Carnegie–Mellon University, Algorithms and Complexity New Directions and Recent Results, 1976, pp. 251–280.

Edited By John H. Reif, "Synthesis of Parallel Algorithms, Randon Sampling Lemmas for Sorting and Selection," pp. 415–417.

Balakrishna R. Iyer, Gary R. Ricard and Peter J. Varman, "Percentile Finding Algorithm for Multiple Sorted Runs," Proceedings of the Fifteenth International Conference on Very Large Data Bases, Amsterdam, 1989, pp. 135–144.

Ralph Kimball and Kevin Strehlo, "Why Decision Support FAILS and How to FIX It," SIGMOD Record, vol. 24, No. 3, Sep. 1995, 92–97.

Greg N. Frederickson an d Donald B. Johnson, "The Complexity of Selection and Ranking in X+Y and Matrices with Sorted Columns," Journal of Computer and System Sciences 24 (1982), pp. 197–208.

Jeffrey Scott Vitter and Elizabeth A. M. Shriver, "Optimal Disk I/O with Parallel Block Transfer," acm Press, Proceedings of the Twenty Second Annual ACM Symposium on Theory of Computing, Baltimore, Maryland, May 14–16, 1990, pp. 159–169.

Zvi Galil and Nimrod Megiddo, "A Fast Selection Algorithm and the Problem of Optimum Distribution of Effort," Jouranl of the Association for Computing Machinery, vol. 26, No. 1, Jan. 1979, pp. 58–64.

Brockett and A. Levine, *Statistics and Probability and Their Applications*, Philadelphia Saunders College Publishing, pp. 172–173.

Richard Cole and Chee K. Tap; "a Parallel Median Algorithm"; Courant Institute of Mathematical Sciences, Technical Report #126; Jul. 1984; pp. 1–5.

Mark H. Nodine and Jeffrey Scott Vitter; "Deterministic Distribution Sort in Shared and Distributed Memory Muliprocessors"; 5th Annual ACM Symposium on Parallel Algorthims and Architectures; Jul. 1993; pp. 120–129.

Charles Gregory Plaxton, "Efficient Computation On Sparse Inteconnection Networks," Standford University Department of Computer Science, Report #STAN–CS–89–1283, Sep. 1989, 119–page document.

Knuth, *The Art of computer Programming*, vol. 3, "Sorting and Searching," pp. 252–380.

\* cited by examiner

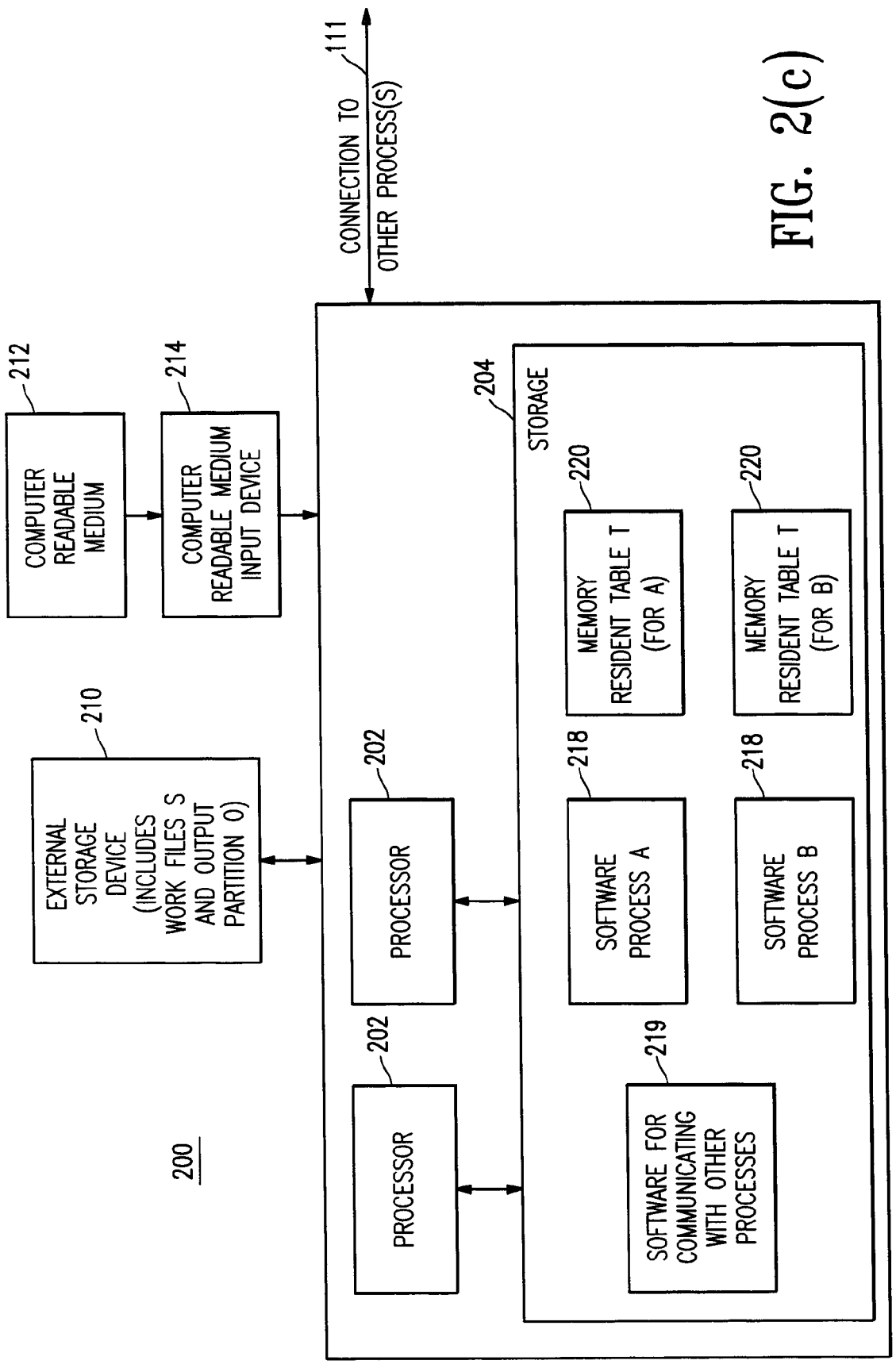

Parallel Merge Sort Implementation

Input Partitions Decomposed Into Sorted Workfile Runs

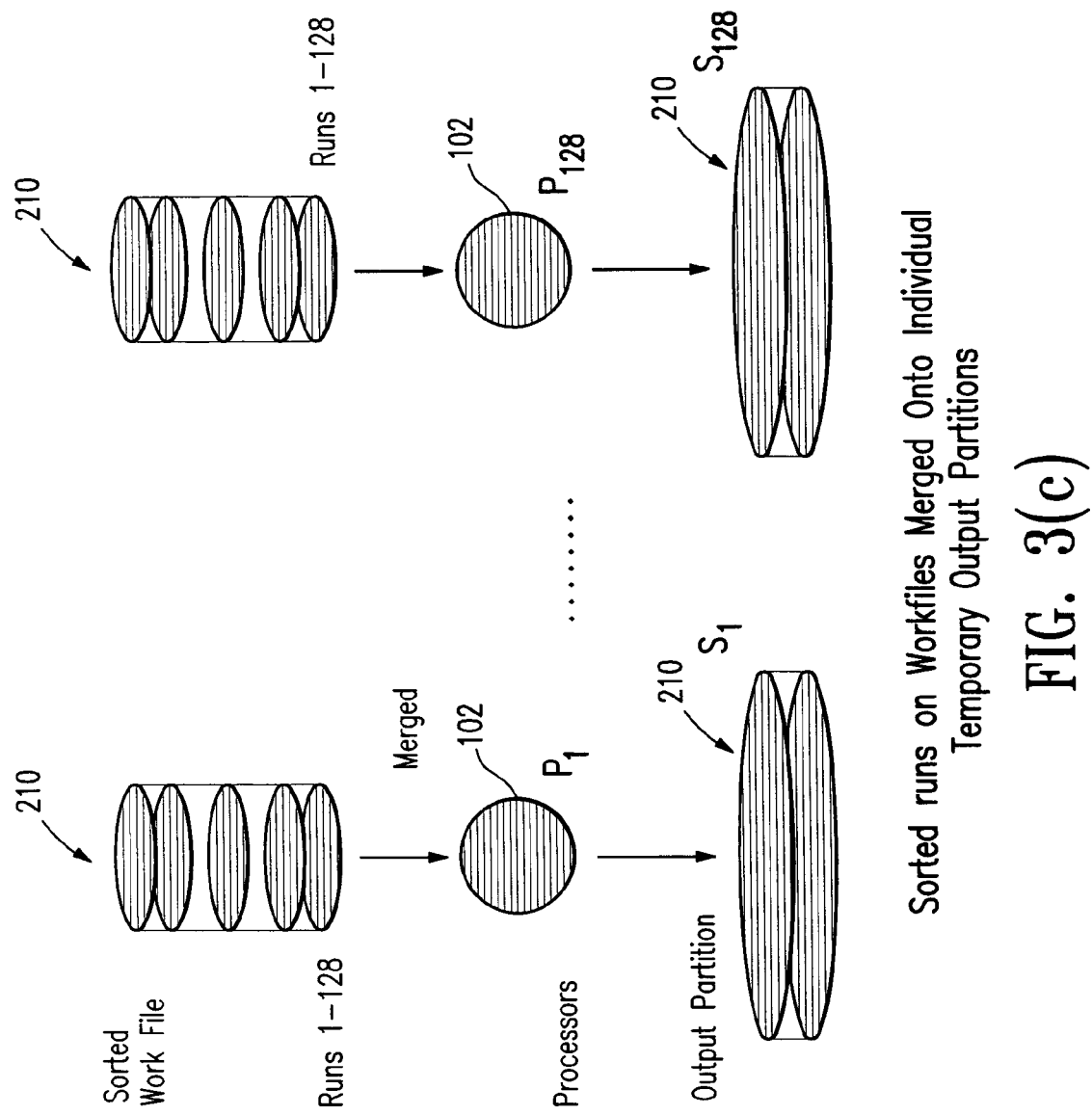
FIG. 3(c) Sorted runs on Workfiles Merged Onto Individual Temporary Output Partitions

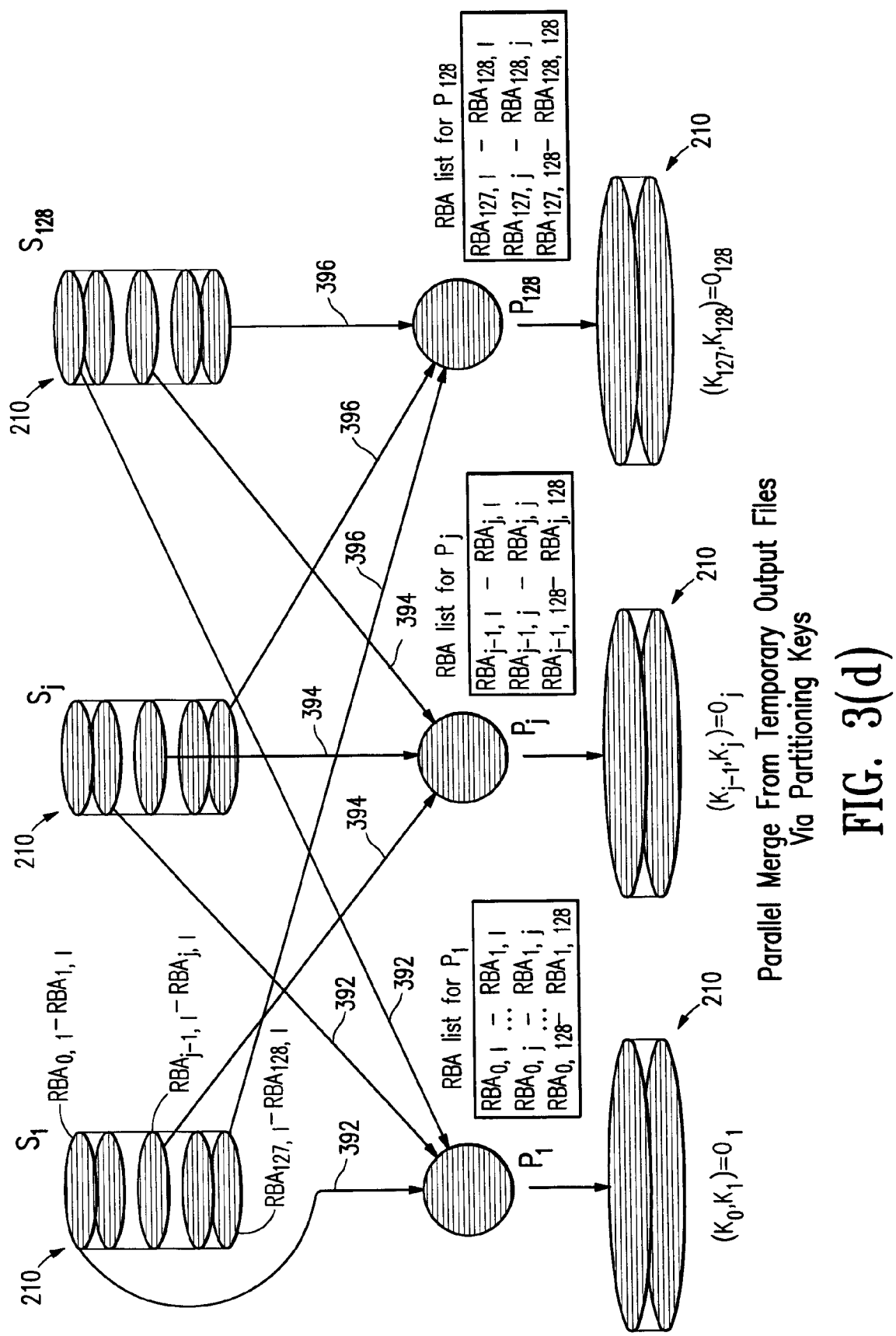
FIG. 3(d) Parallel Merge From Temporary Output Files Via Partitioning Keys

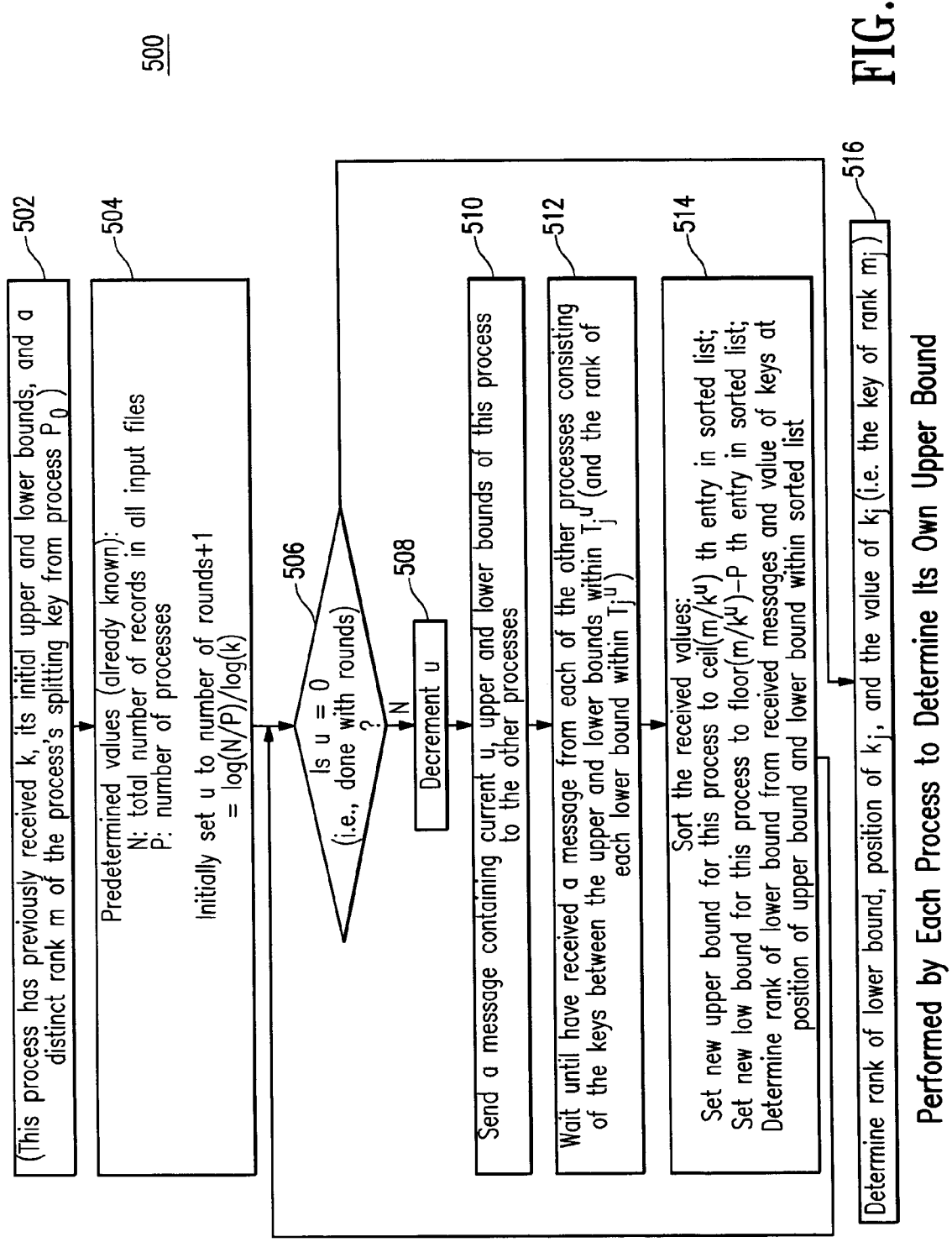
FIG. 5(a) Performed by Each Process to Determine Its Own Upper Bound

Merging by Each Process to Obtain Data Within Its Upper and Lower Bounds

Format of Key Value

| Partition /Item | P1 | P2 | P3 | P4 |
|---|---|---|---|---|
| 1 | 084 | 075 | 059 | 166 |
| 2 | 185 | 093 | 116 | 189 |
| 3 | 288 | 124 | 151 | 215 |
| 4 | 308 | 142 | 239 | 233 |
| 5 | 321 | 149 | 241 | 451 |
| 6 | 474 | 154 | 310 | 467 |
| 7 | 575 | 239 | 317 | 548 |
| 8 | 590 | 332 | 428 | 608 |
| 9 | 781 | 399 | 434 | 613 |
| 10 | 821 | 521 | 446 | 735 |
| 11 | 847 | 536 | 610 | 758 |
| 12 | 851 | 555 | 617 | 812 |
| 13 | 866 | 606 | 675 | 850 |
| 14 | 886 | 714 | 696 | 881 |
| 15 | 899 | 865 | 797 | 890 |
| 16 | 952 | 976 | 808 | 992 |

Sample   k=2   u=3

FIG. 6(a)

Sorted list for $T^3$

| | | | |
|---|---|---|---|
| 332 | 428 | 590 | 608 |
| 808 | 952 | 976 | 992 |

$N=64$     $P=4$     $k=2$     $u=3$
$k^u=8$

Upper bound index for $s_{32} = \text{ceil}(32/8) = 4$
Lower bound $= \text{floor}(32/8) - 4 = 0$ $t_4 = 608$
$t_0 = 0$

FIG. 6(b)

| Partition /Item | Sample selection | P1 | P2 | P3 | P4 |
|---|---|---|---|---|---|
| 1 | | 084 | 075 | 059 | 166 |
| 2 | | 185 | 093 | 116 | 189 |
| 3 | | 288 | 124 | 151 | 215 |
| 4 | ⇑ | 308 | 142 | 239 | 233 |
| 5 | | 321 | 149 | 241 | 451 |
| 6 | | 474 | 154 | 310 | 467 |
| 7 | | 575 | 239 | 317 | 548 |
| 8 | ⇑ | 590 | 332 | 428 | 608 |
| 9 | | 781 | 399 | 434 | 613 |
| 10 | | 821 | 521 | 446 | 735 |
| 11 | | 847 | 536 | 610 | 758 |
| 12 | ⇑ | 851 | 555 | 617 | 812 |
| 13 | | 866 | 606 | 675 | 850 |
| 14 | | 886 | 714 | 696 | 881 |
| 15 | | 899 | 865 | 797 | 890 |
| 16 | ⇑ | 952 | 976 | 808 | 992 |

Sample k=2   u=2
Sample Interval=(0,608)

FIG. 7(a)

Sorted list for $T^2$

| 142 | 233 | 239 | 308 |
|-----|-----|-----|-----|
| 332 | 428 | 555 | 590 |
| 608 |     |     |     |

$N=64$  $P=4$  $k=2$  $u=2$
$k^u=4$

Upper bound index for $s_{32}$ = ceil(32/4) = 8
Lower bound = floor(32/4)−4 = 4

Lower bound has rank 1 in $T^2$ $t_8 = 590$
$t_4 = 308$

Interval in $T^1$ = (308,590)

FIG. 7(b)

| Partition/Item | Sample selection | P1 | P2 | P3 | P4 |
|---|---|---|---|---|---|
| 1 |  | 084 | 075 | 059 | 166 |
| 2 | ⇑ | 185 | 093 | 116 | 189 |
| 3 |  | 288 | 124 | 151 | 215 |
| 4 | ⇑ | 308 | 142 | 239 | 233 |
| 5 |  | 321 | 149 | 241 | 451 |
| 6 | ⇑ | 474 | 154 | 310 | 467 |
| 7 |  | 575 | 239 | 317 | 548 |
| 8 | ⇑ | 590 | 332 | 428 | 608 |
| 9 |  | 781 | 399 | 434 | 613 |
| 10 | ⇑ | 821 | 521 | 446 | 735 |
| 11 |  | 847 | 536 | 610 | 758 |
| 12 | ⇑ | 851 | 555 | 617 | 812 |
| 13 |  | 866 | 606 | 675 | 850 |
| 14 | ⇑ | 886 | 714 | 696 | 881 |
| 15 |  | 899 | 865 | 797 | 890 |
| 16 | ⇑ | 952 | 976 | 808 | 992 |

Sample k=2  u=1
Interval=(308,590)

FIG. 8(a)

Sorted list for $T^1$

| 308 | 310 | 332 | 428 |
|-----|-----|-----|-----|
| 446 | 467 | 474 | 521 |
| 555 | 590 |     |     |

$N=64$    $P=4$    $k=2$    $u=1$
$k^u=2$

Upper bound index for $s_{32}$ = ceil(32/2) = 16
Lower bound = floor(32/2)−4 = 12

Lower bound has rank 9 in $T^1$ $t_{16} = 521$
$t_{12} = 428$

Interval in $T^0$ = (428, 521)

FIG. 8(b)

| Partition /Item | Sample selection | P1 | P2 | P3 | P4 |
|---|---|---|---|---|---|
| 1 | ⇧ | 084 | 075 | 059 | 166 |
| 2 | ⇧ | 185 | 093 | 116 | 189 |
| 3 | ⇧ | 288 | 124 | 151 | 215 |
| 4 | ⇧ | 308 | 142 | 239 | 233 |
| 5 | ⇧ | 321 | 149 | 241 | 451 |
| 6 | ⇧ | 474 | 154 | 310 | 467 |
| 7 | ⇧ | 575 | 239 | 317 | 548 |
| 8 | ⇧ | 590 | 332 | 428 | 608 |
| 9 | ⇧ | 781 | 399 | 434 | 613 |
| 10 | ⇧ | 821 | 521 | 446 | 735 |
| 11 | ⇧ | 847 | 536 | 610 | 758 |
| 12 | ⇧ | 851 | 555 | 617 | 812 |
| 13 | ⇧ | 866 | 606 | 675 | 850 |
| 14 | ⇧ | 886 | 714 | 696 | 881 |
| 15 | ⇧ | 899 | 865 | 797 | 890 |
| 16 | ⇧ | 952 | 976 | 808 | 992 |

Sample   k=2   u=0
Interval=(428,521)

FIG. 9(a)

Sorted list for $T^0 = S$ 428   434   446   451
467   474   521

$N=64$   $P=4$   $k=2$   $u=0$
$k^u=2$

Lower bound has rank 26 in $T^0 = S$ $t_{32} = S_{26+6} = 521$

FIG. 9(b)

| Partition Item | Sample selection P1 | P2 | P3 | P4 |
|---|---|---|---|---|
| 1 | 084 | 075 | 059 | 166 |
| 2 | 185 | 093 | 116 | 189 |
| 3 | 288 | 124 | 151 | 215 |
| 4 | 308 | 142 | 239 | 233 |
| 5 | 321 | 149 | 241 | 451 |
| 6 | 474 | 154 | 310 | 467 |
| 7 | 575 | 239 | 317 | 548 |
| 8 | 590 | 332 | 428 | 608 |
| 9 | 781 | 399 | 434 | 613 |
| 10 | 821 | 521 | 446 | 735 |
| 11 | 847 | 536 | 610 | 758 |
| 12 | 851 | 555 | 617 | 812 |
| 13 | 866 | 606 | 675 | 850 |
| 14 | 886 | 714 | 696 | 881 |
| 15 | 899 | 865 | 797 | 890 |
| 16 | 952 | 976 | 808 | 992 |

Rank of $521 = 6+10+10+6 = 32 = m$

FIG. 10

METHOD AND APPARATUS FOR PARALLEL SORTING USING PARALLEL SELECTION/PARTITIONING

APPENDIX

This application includes Appendix A, which forms a part of this specification and which is herein incorporated by reference.

FIELD OF THE INVENTION

This invention relates generally to data processing and, specifically, to a method and apparatus that partitions data in conjunction with, for example, a parallel sorting method.

BACKGROUND OF THE INVENTION

As data processing has advanced in recent years, the amount of data stored and processed by computer and other data processing systems has grown enormously. Current applications, such as data mining systems and systems that perform data operations on very large databases, often need to process huge amounts of data (called a "data set"). Such large data sets can often be larger than the memory of the computer or computers that process them. For example, current data sets are often in the range of several terabytes ($2^{40}$) or more, and it is anticipated that data sets will be even larger in the future. Current data processing systems require parallel external sorting techniques.

Various conventional methods have been devised to sort very large amounts of data, including data that is larger than the memory of the system doing the sorting. The standard text of Knuth, "The Art of Computer Programming, Vol. 3, Sorting and Searching," Addison Wesley Longman Publishing, second edition, 1998, pp 252–380 discloses several conventional external sorting methods. In order to perform a parallel sort, it is necessary to determine a set of sort key values that will be used to divide the sorted data between the multiple processes or cpus involved in the sort. This problem is called "partitioning" or "selection." Several conventional parallel sorts use a sampling method to determine the keys for the multiple processes.

As data sets grow ever larger, however, conventional sorting methods are often not fast enough and are not always efficient for all distributions of data. In addition, certain conventional methods do not work when the data to be sorted contains variable length records. What is needed is a new method of parallel sorting that is faster and more efficient that conventional parallel sorting methods and that operates correctly on a wide range of data distributions, as well as variable length records.

SUMMARY OF THE INVENTION

An embodiment of the present invention provides a method and apparatus for sorting very large data sets using a parallel merge sort. A described embodiment of the invention operates in a clustered computer system, although it is contemplated that the invention can be implemented for any appropriate distributed (or shared memory) computer system, such as a computer network or the internet. The method of the present invention can also be used to locate database quantiles or to partition other types of keys in near-minimum time (as discussed in further detail below). The method of the present invention can also be used to perform a distribution sort, as described in Appendix A, which is a part of this specification and is herein incorporated by reference.

Given sorted work files $S_1, \ldots, S_P$, produced by P processes, the described embodiment of the method effectively implements a parallel merge onto respective output partitions $O_1, \ldots, O_p$ of the P processes. Because each of these output partitions $O_j$ has a finite size ($1<=j<=p$), the invention must quickly determine "splitting keys" for each output partition $O_j$ in such a way that the data in the work files will be split between the multiple output partitions $O_j$ without overrunning the size of any of the partitions $O_j$. Once the splitting keys for each partition are determined, the processes exchange data so that the output partitions of each process contains data between the splitting keys associated with that output partition.

In accordance with the purpose of the invention, as embodied and broadly described herein, the invention relates to a method of parallel sorting a large amount of data, performed by a plurality of processes of the data processing system and comprising: providing, for each process, a work file, each work file containing a respective portion of the data to be sorted, where the data within each work file is in sorted order; determining an initial upper and lower bound associated with each process; sending, by each of the processes in parallel, a plurality of messages to each of the other processes indicating current upper bounds of the sending process to determine an upper bound for the sending process; and performing, by the processes, a merge in which each of the processes creates an output partition containing data within its upper and lower bounds.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 2(a)–2(c) are exemplary block diagrams of a process in a distributed data processing system, such as the system of FIG. 1.

FIGS. 3(b)–3(d) are block diagrams showing the steps of FIG. 3(a) in a diagramatic format.

FIG. 5(a) is a flowchart showing how a process communicates with other processes to determine its own upper bound key.

FIGS. 6(a) and 6(b) are diagrams of an example of how a process determines an upper bound of its key.

FIGS. 7(a) and 7(b) are further diagrams in the example of how a process determines an upper bound of its key.

FIGS. 8(a) and 8(b) are further diagrams in the example of how a process determines an upper bound of its key.

FIGS. 9(a) and 9(b) are further diagrams in the example of how a process determines an upper bound of its key.

FIG. 10 is a further diagram in the example of how a process determines an upper bound of its key.

DETAILED DESCRIPTION OF PREFERRED EMBODIMENTS

The present invention now will be described more fully with reference to the accompanying drawings, in which several embodiments of the invention are shown. The present invention, however, may be embodied in many different forms and should not be construed as limited to the embodiments set forth herein, rather these embodiments are provided so that this disclosure will be thorough and complete and will fully convey the invention to those skilled in the art.

A. General Discussion

Figure 1:
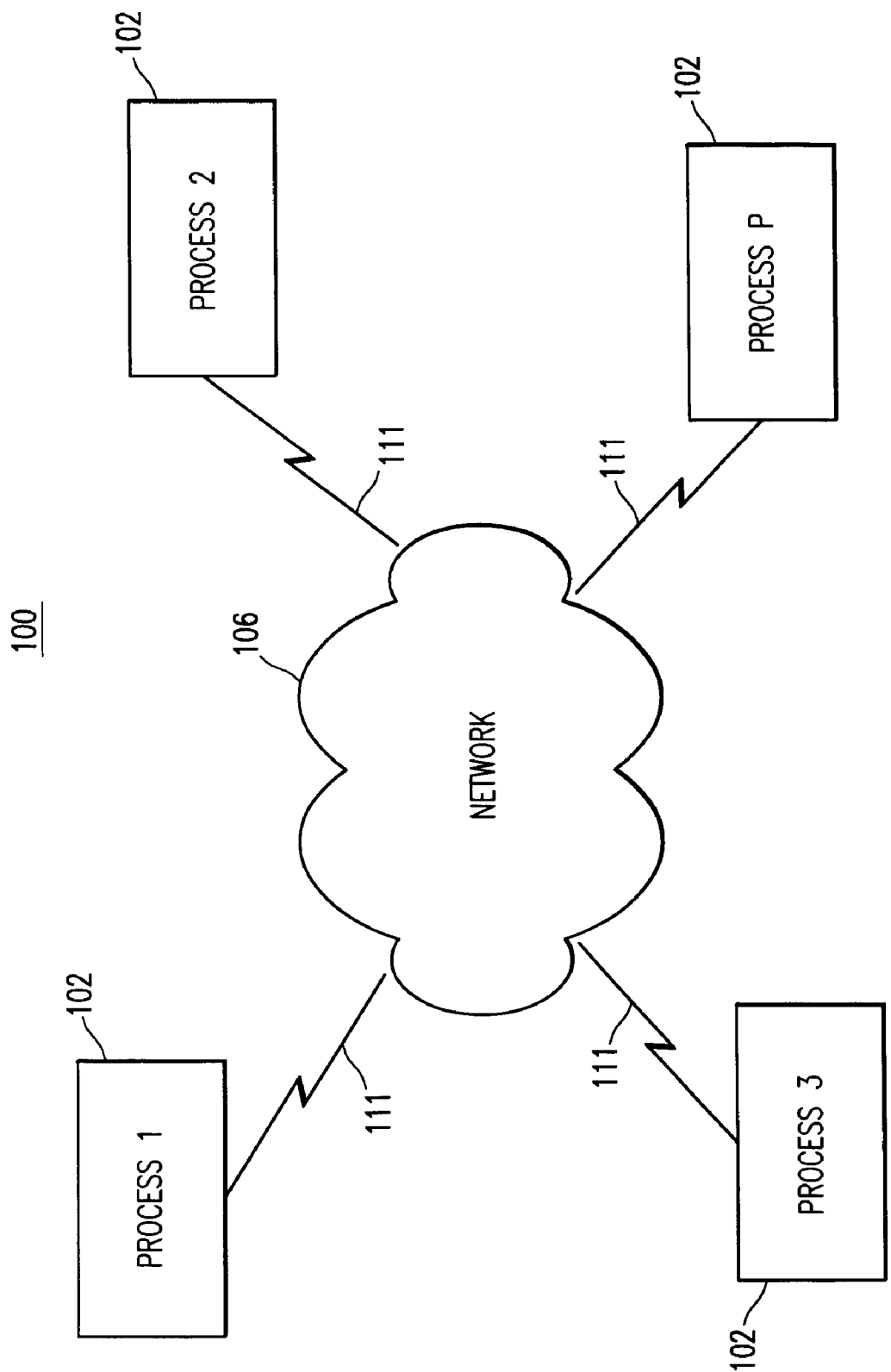
FIG. 1 is a block diagram of a typical distributed data processing system.

FIG. 1 is a block diagram of a typical distributed data processing system 100. Data processing system 100 can be, for example, a cluster system, such as the ServerNet system, available from Compaq Computers Corporation. System 100 could also be a non-clustered network, an intranet, the internet, or any appropriate network. The described embodiment executes under the NT or Tandem "Nonstop" operating systems, although any appropriate operating system can be employed. It is contemplated that the present invention can be implemented on any appropriate distributed computer system. The present invention can also be implemented on any appropriate non-distributed computer system in which one or more processes share memory.

System 100 includes processes 1 ... P 102 connected to each other via a network 106 via connections 111. In the described embodiment, the connection between processes is an "any to any" connection, meaning that any process can communicate with any other process. Moreover, in the described embodiment, each process can access the external storage of the other processes. In various embodiments, this external storage access can be done either directly or through any other appropriate method. Communications between the processes preferably proceeds asynchronously and in parallel.

Figure 2A:
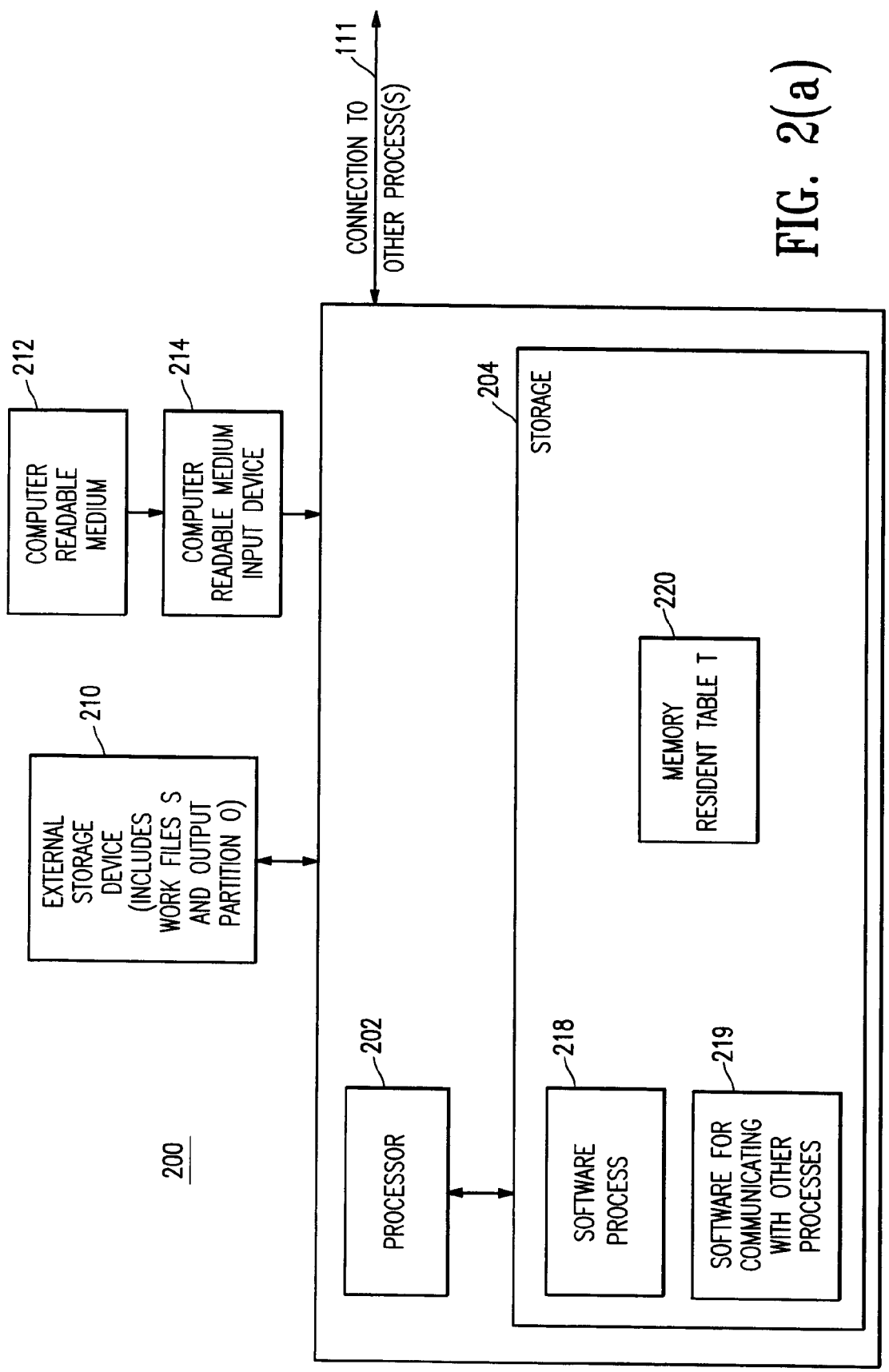

FIG. 2(a) as a block diagram of an exemplary node 200 in a distributed data processing system. At least some of the other nodes in the system are contemplated to be nodes 200, although the system may contain other types of nodes. The node 200 includes a processor 202 (or any appropriate processor or processors) and some form of storage 204. A portion of the storage 204 contains a software process 218 and a memory resident table T 220 of the present invention. Storage 204 preferably also includes software 219 (or hardware) that allow process 218 to communicate with other processes in the system.

Each node 200 preferably also includes an external storage device 210, such as a disk storage device. External storage device 210 stores the work file W for process 218 and the output partition O for the process 218, as described in further detail below. Node 200 preferably also includes an input device (not shown), such as a keyboard, mouse, touch screen, voice control, etc. Node 200 preferably also includes an output device (not shown), such as a printer, display screen, or voice output device.

Node 200 preferably also includes a computer readable medium input device 214 that inputs instructions and/or data from a computer readable medium 212. The term "computer-readable medium" as used herein refers to any medium that participates in providing instructions to a process for execution. Such a medium may take many forms, including but not limited to, non-volatile media, volatile media, and transmission media. The instructions can also be transmitted to node 200 via a network, such as a LAN, a WAN, or the Internet.

In the following discussion, it is understood that the appropriate processor(s) 202 (or similar processors) perform the steps of methods and flowcharts discussed, preferably executing instructions stored in their respective storage areas 204. It will also be understood that the invention is not limited to any particular implementation or programming technique and that the invention may be implemented using any appropriate techniques for implementing the functionality described herein. The invention is not limited to any particular programming language, network, or operating system. In alternative embodiments, hard-wired circuitry may be used in place of or in combination with software instructions to implement the invention. Thus, embodiments of the present invention are not limited to any specific combination of hardware circuitry and software.

Figure 2B:
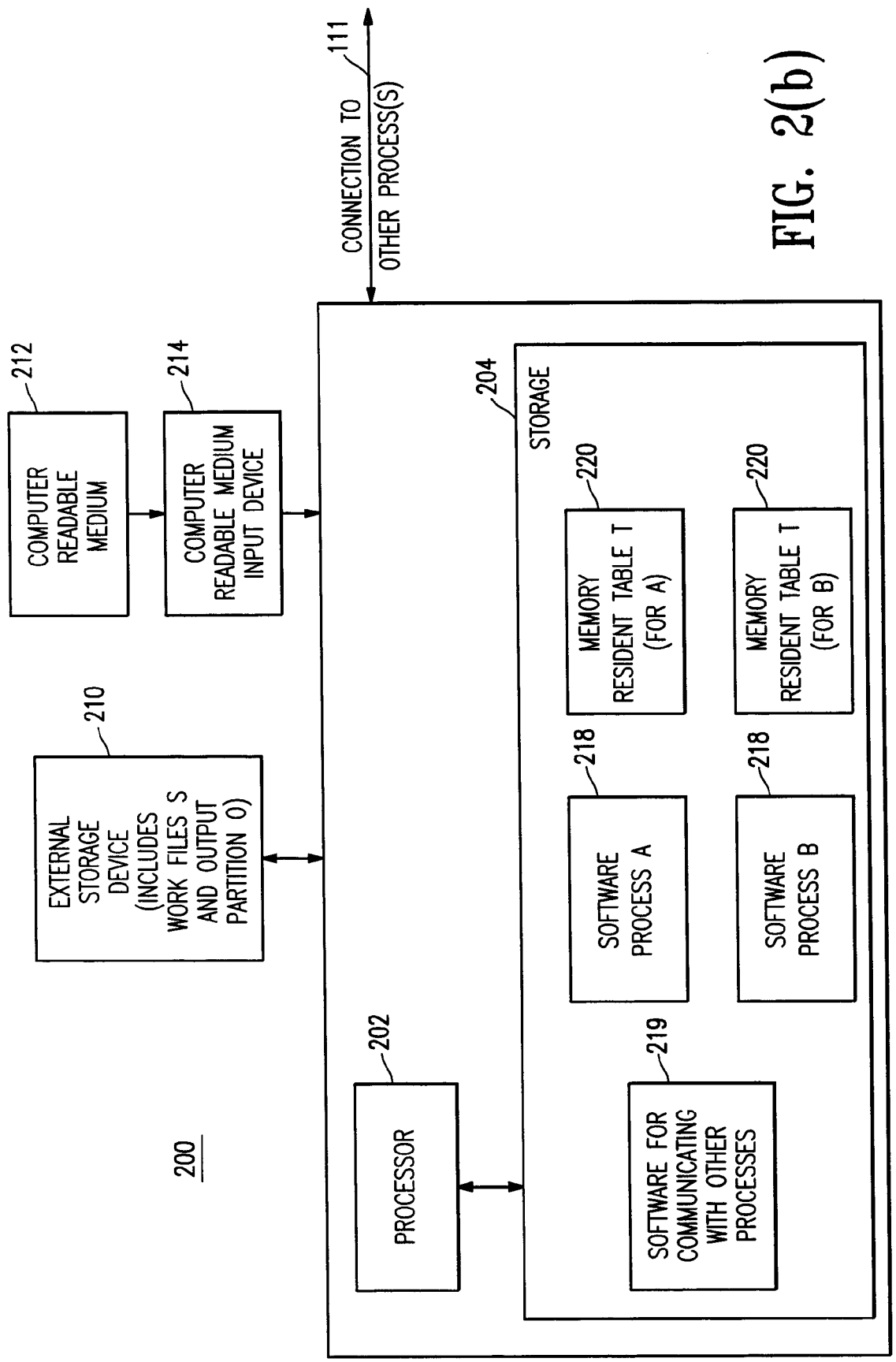

The described embodiment (FIG. 2(a)) contains one software process 218 per processor 202, but the present invention could also be implemented on a system where multiple processes 218 share a single processor 202 (see FIG. 2(b)) or where a node 200 contains more than one processor 202 and more than one process 218 (see FIG. 2(c)). Thus, the present invention also can be implemented on a data processing system having a different number of processors than processes. As discussed above, the present invention can also be implemented on a non-distributed data processing system where the processes 218 share memory and one or more processors 202. The present invention can also be implemented on any other appropriate hardware.

B. Description of a Parallel Merge Sort using Partitioning

Figure 3A:
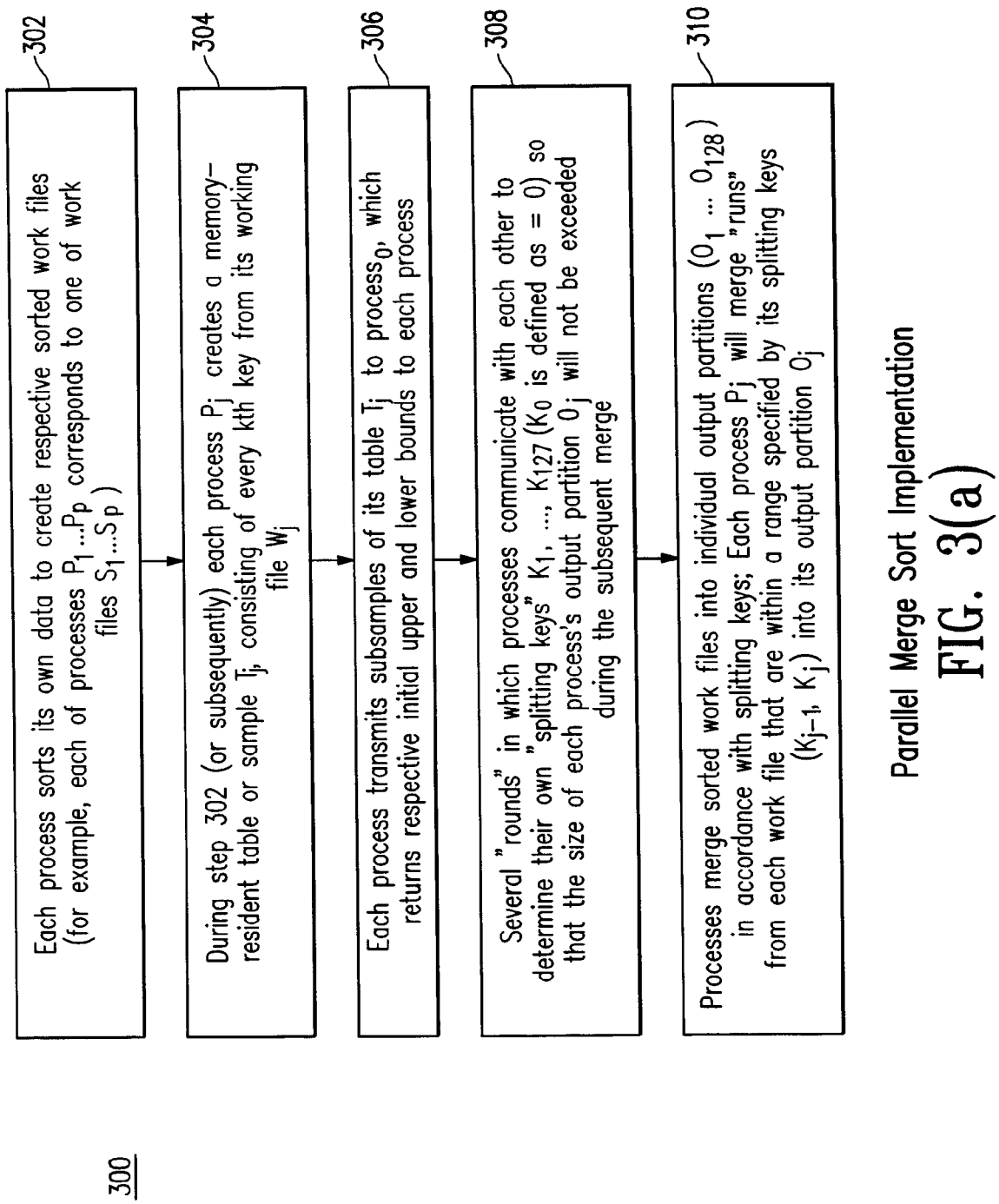
FIG. 3(a) is a flow chart showing an overview of a method of performing a sort in accordance with the present invention.
Figure 3B:
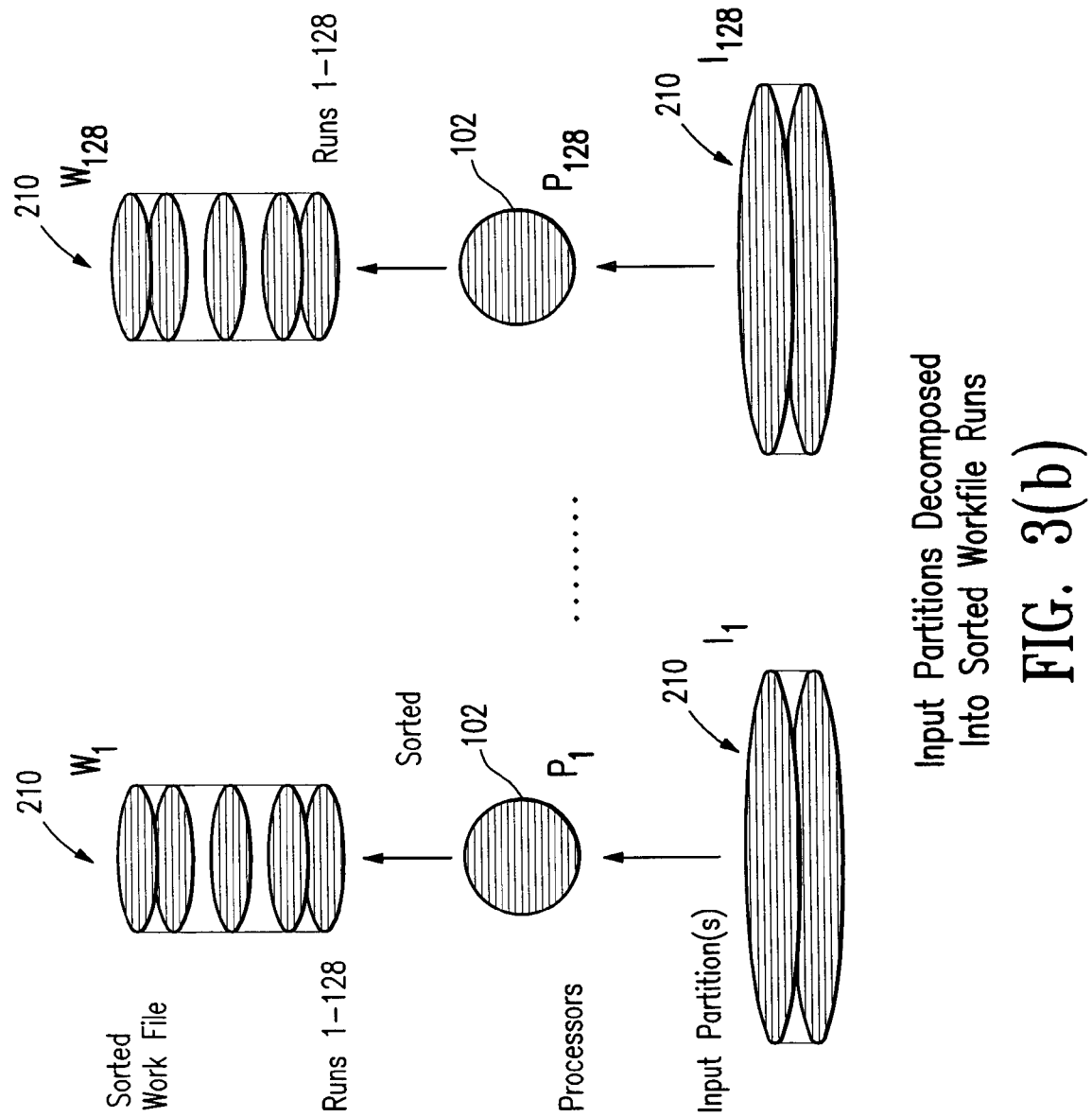
Figure 4:
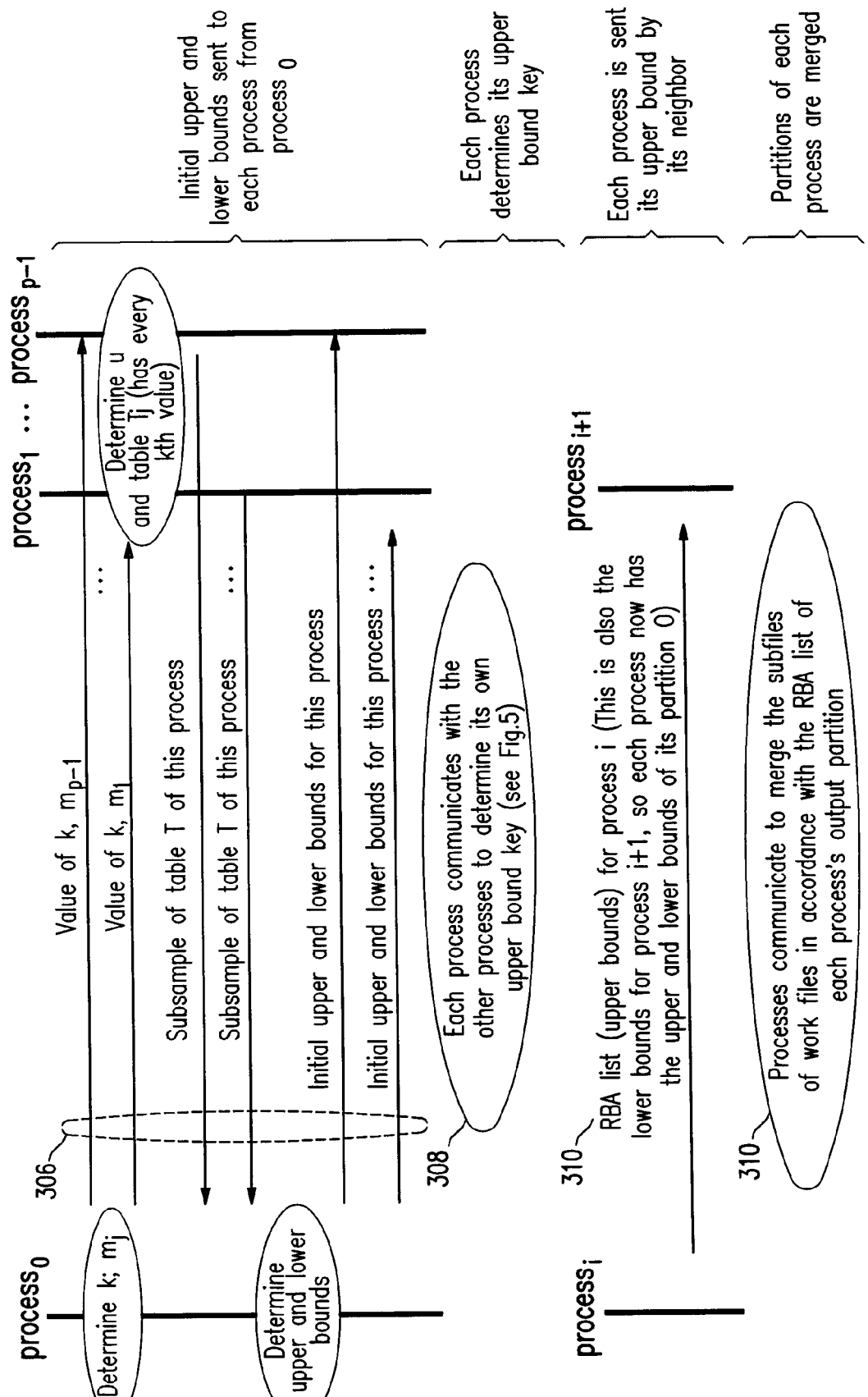
FIG. 4 is a diagram showing further details of FIG. 3(a) in a first embodiment of the invention.

FIG. 3(a) is a flow chart showing an overview of a method of performing a sort in accordance with the present invention. FIGS. 3(b)–3(d) show an alternative view of the flowchart of FIG. 3(a). FIG. 4 shows additional details of the flow chart of FIG. 3(a). The discussion of the described embodiment uses the following notation.

$S_j$ - sorted partition, $j = 1, \ldots, P$ $= \{s_{i,j}: i = 1, \ldots, \alpha_j\}$ $|S_j| = \alpha_j$ = cardinality of $S_j$ $S = \{s_{i,j}: i <= \alpha_j, j <= P\} = \bigcup \{S_j: j = 1, \ldots, P\}$ $K_{i,j}$ - sort key of record $s_{i,j}$ ($K_{i,j} < K_{i+1,j}$)

$p_j$ - process $j$ $N = \sum \{\alpha_j: j = 1, \ldots, P\}$ $\lfloor x \rfloor = floor(x)$ = largest integer $<= x$ $\lceil x \rceil = ceil(x)$ = smallest integer $>= x$ -continued $r_Y(x)$ = rank of $x$ = number of elements less than or equal to $x$ in a given sorted set of $Y$ (It should be noted that, in alternate embodiments, rank of x is defined as less than or equal to x in a given sorted set Y.) Note that $r_S(x) = \Sigma\{r_{S_j}(x): j=1, \ldots, P\}$. (Hence in a parallel protocol $p_j$ can obtain the rank of x by broadcasting x and summing the responses.)

In the following description, timing estimates will always refer to a large prototype parallel sort with:

P=128 keylength=32 bytes record length=128 bytes $a_j$=225 for each j

This gives $N=2^{32}$, file size=$2^{39}$=512 GB, and partition size=$2^{32}$=4 GB It should be understood that these values are used for the purpose of example only and that other values can be used without departing from the spirit and scope of the present invention.

Figure 5B:
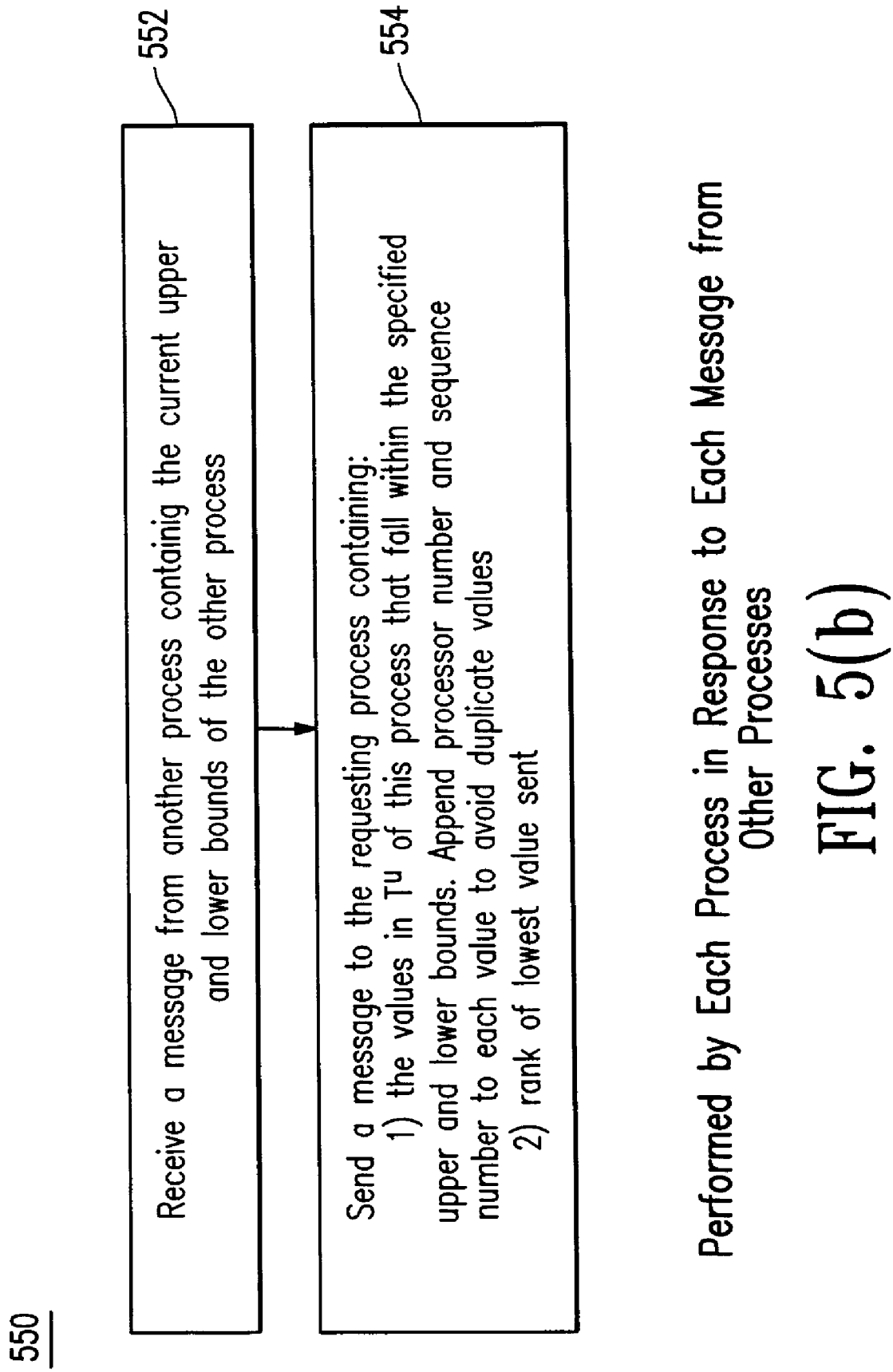
FIG. 5(b) is a flowchart showing how a process responds to messages from other processes that are trying to determine their own upper bound key.
Figure 5C:
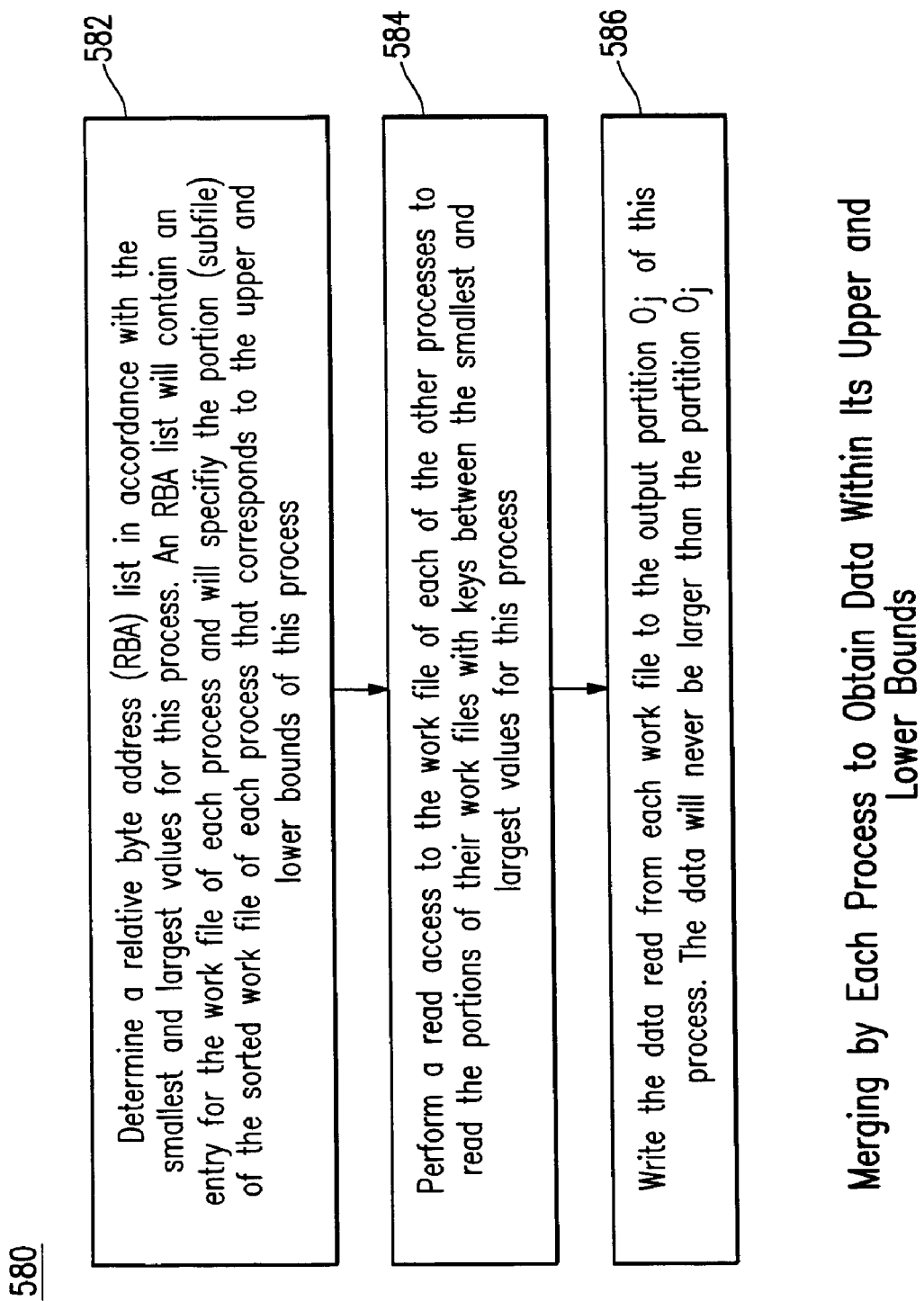
FIG. 5(c) is a flowchart showing how a process accesses the work files of the other processes in accordance with the process's upper and lower bounds to merge the work files.
Figure 5D:
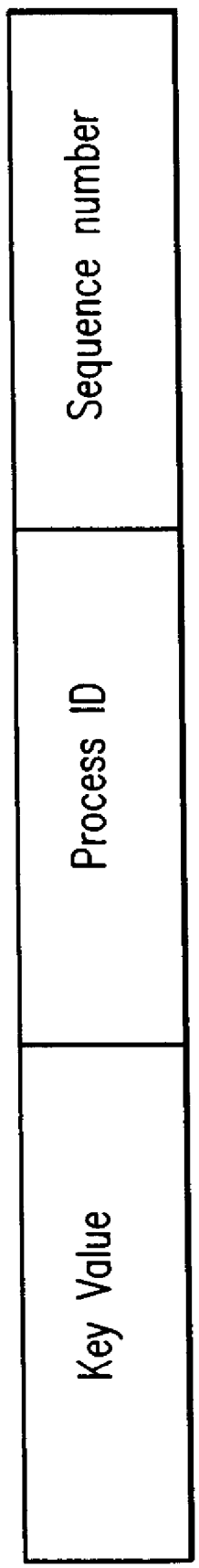
FIG. 5(d) shows a format of a value passed between processes during "rounds."

We shall assume each key has been appended with a sequence number or database primary key so that all are unique. Inequalities among the $s_{i,j}$ will implicitly refer to their sort keys $K_{i,j}$. FIG. 5(d) shows an exemplary format for an appended key.

As shown in step 302 of FIG. 3(a), each process initially sorts its own data to create a sorted work file S for the process. This work file S is typically stored on external storage. As shown in FIGS. 3(b) and 3(c), the sort of step 302 can be any appropriate external sort such as, for example, a tournament sort. The result of step 302 is that each process $P_j$ has an associated sorted work file S of size $\alpha_j$. Each of these work files contains different data, which is a portion of the data to be sorted. Although each work file S is sorted, there may be overlap of data between the work files S of the various processes and the work files must be merged in order to complete the sort.

As shown in step 304 of FIG. 3(a), each process receives a value "k" from a central process (such as process$_0$) and generates its own memory-resident table T 220 in accordance with K. Tables T 220 are preferably generated during step 302 but can also be generated in a separate step. Tables T 220 each contain every kth record from the process's associated work file S. Because the work files are sorted, each corresponding table T 220 is also sorted. The value k is determined as follows:

$k=2^{\beta-\gamma}$ the values $\beta$ and $\gamma$ are determined as follows:

The number of processes P is defined as $2^\gamma$, where $\gamma$ is defined as (binary) log(P), where P is a number of processes. Thus, $\gamma$ is determined in accordance with the number of processes P. A predetermined in-memory sorting threshold is defined as $2^\beta$ ($\gamma<\beta$), based on key length and available memory.

Once $\beta$ and $\gamma$ are known, the value k can be determined. As shown in FIGS. 4 and 5(a), in the described embodiment, a central process (e.g., process$_0$) determines k and sends it to each of the other processes. Alternately, each process 218 could determine k for itself. The central process also determines a different value $m_j$ for each process, as discussed below.

In step 306 of FIG. 3(a), the processes transmit a portion of the contents of their tables T 220 to a central process, which sorts the contents of tables T 220, determines upper and lower bounds for each process, and returns an initial upper and lower bound to each process 218. In the described embodiment, each process transmits every $k^{u-1}$ th entry in its Table T to the central process. This is also shown in FIG. 4. As mentioned above, table T already contains every k th record from its corresponding work file. The value u is the number of "rounds" that will performed in step 308 and is determined as follows:

$u=\log(N/P)/\log(k)$

This is discussed further in connection with step 504 of FIG. 5(a), as discussed below.

The central process determines the indices of the initial lower and upper bounds for each process as follows (in order to determine (select) the key of rank $m_j$).

Initial lower bound = $\lfloor m_j/k^u \rfloor - P$ initial upper bound = $\lceil m_j/k^u \rceil$ In step 308 of FIG. 3(a), the processes 218 communicate with each other during several "rounds" to determine their respective splitting keys. In a preferred embodiment, k is determined so that the number of rounds is 2 (a round by the central process and one more round between the processes themselves). Other embodiments can use other numbers of rounds. Details of this step are shown in FIGS. 5(a) and 5(b).

In step 310 of FIG. 3(a), the processes 218 read portions of the sorted work files of the other processes into their output partitions O in accordance with the results of step 308. Each process 218 will end up with an output partition O having values between the upper and lower bounds of the process 218. Further exemplary details are shown in FIGS. 3(d) and 5(c). Thus, after step 310, the data will be sorted. Each output partition $O_j$ contains all data between the upper and lower bounds of its associated process. All partitions are sorted and ordered with keys in $O_j$<=keys in $O_{j+1}$.

FIG. 4 is a diagram showing further details of FIG. 3(a) in a first embodiment of the invention. In step 306 of FIG. 4, each process receives the value k from the central process and sends every $k^{u-1}$ th entry from its table T to the central process. The central process then sends upper and lower bounds to each process 218. Details of step 308 are shown in FIGS. 5(a) and 5(b).

In step 310, each process sends its upper bounds to its neighbor. The lower bounds of process is also the upper bounds for process$_{i+1}$. After each process receives the upper bounds of its neighbor, it knows its own upper and lower bounds. Each process then determines its own RBA (relative byte address) list. The RBA list of each process contains the relative byte addresses of the subfiles of each work file of the other processes that will contain values within the process's upper and lower bounds.

RBAs are determined as follows:

For i=1 to p (Having located a key of rank m)
  Search for nearest key from process $P_i$ with process ID=i<$k_j$
    i) If found: RBA=(sequence number+1)·record length
    ii) If no such key found:
      Search for nearest key from process $P_i$ with process ID=i>$K_j$
        If found: RBA=sequence number·record length An analogous method can be used for variable length records, where RBA is defined as sequence number.

For example, process $P_j$ will have obtained the RBA of the binary insertion point of $K_j$ within each work file $S_j$ of each of the other processes (i.e., $RBA_{j,1} \ldots RBA_{j,128}$). Process $P_{j-1}$ sends the list ($RBA_{j-1,1} \ldots RBA_{j-1,128}$) to its neighbor process $P_j$. The pairing of these RBA lists by process $P_j$ identifies the subfiles of the respective work files ($(RBA_{j-1,i} \ldots RBA_{j,i}]$) which process $P_j$ will subsequently merge onto its output partition $O_j$.

Referring to FIG. 5(a), which is a flowchart showing how a process communicates with other processes to iteratively determine its own upper bound key (step 308 of FIGS. 3 and 4). The steps of FIG. 5(a) are performed by each of the P processes 218. The steps 506 through 514 form a loop that is performed for each of u "rounds."

In step 510, process 218 sends a message to each of the other processes. The message contains the current upper and lower bounds of the process sending the message.

In step 512 the process receives a responsive message from each of the other processes. Each of these messages contains the contents of the table T for the process sending the responsive message that are between the upper and lower bounds from step 510. The responsive message also contains the "rank" of the transmitted lower bound in the table T of the process sending the responsive message.

"Rank" is defined as the number of entries in a table T that is less than or equal to a certain value. For example, in FIG. 7(a), the rank of the value "308" in table T of process P1 (where we are considering every fourth entry) is "1", since one entry is less than or equal to the value 308. Similarly, in FIG. 8(a), the rank of the value "308" in table T of process P1 (where we are considering every second entry) is "2", since two entries are less than or equal to the value 308.

In step 514, the process 218 sorts the values returned by the other processes and determines a new upper and lower bound for itself. Process 218 also determines the position of the new upper and lower bounds in the sorted list of returned values.

In step 516, if u rounds have been performed, process 218 determines an upper bound of a specified rank mp as discussed in further detail below in connection with step 310 of FIG. 3(a).

FIG. 5(b) is a flowchart showing how a process responds to messages from other processes that are trying to determine their own upper bound key. This flow chart is performed in response to a message sent in step 510. The steps of FIG. 5(b) are performed by each process receiving a message of step 510.

In step 552, the receiving process receives a message containing an upper and lower bound and the rank of the lower bound. In step 554, the process sends a responsive message containing the values in table T of this process that falls within the specified upper and lower bounds. The described embodiment also appends a process id and a sequence number to the upper and lower bounds. The process id is unique for the process and the sequence number represents the ordinal position within the sorted input $S_j$.

Returning to step 310 of FIG. 3, once the rounds of FIG. 5 have been completed, each process will know its own largest and smallest keys. FIG. 5(c) is a flowchart showing how a process accesses the work files S of the other processes in accordance with the process's largest and smallest keys in order to merge the work files. Step 582 determines a relative byte address (RBA) list in accordance with the key $K_j$ of specified rank in $m_j$ for this process 218. An RBA list will contain P entries and will specify the portion of the sorted work file of each partition that corresponds to the upper and lower bounds of this process. Step 584 performs a read access to the work file S of each of the other processes to read the portions of their work files that correspond to the largest and smallest keys of this process. Step 586 then writes the data from each work file to the output partition O of this process. The data will never be larger than the partition O.

FIG. 3(d) shows an example in which data 392 from each work file that falls within the upper and lower bounds of process $P_1$ is read by process $P_1$. The RBA list for process $P_1$, indicates the ranges within which $P_1$'s largest and smallest keys lie in each work file S. Similarly illustrated is the merge of data 394 and 396.

C. An Example of a Partitioning Within a Parallel Merge Sort

FIGS. 6(a) and 6(b) are diagrams of an example of how a process $P_2$ determines its upper bound using the partitioning method described above. In the example, process $P_2$ is searching for a key of rank $m_2$. In the example, k=2. (Although k would normally be a larger value, k=2 is used to enhance the clarity of the example). In the example, the value $m_2$ assigned to process $P_2$ is 32.

The value m represents a median value of the total number of values to be sorted (here 64). In general:

$$m_j = \Sigma(|O_k|), \text{ where } k<=j$$

In the example, FIG. 6(a) shows the data in the work files for each of four processes ($P_1$–$P_4$). Here, since k=2, the memory tables $T_j$ (not shown) would actually contain every other value shown in FIG. 6(a). In FIG. 6(a), where u=3, every eighth value is considered (i.e., $2^u=2^3=8$). In the example, process $P_1$ has initial upper and lower bounds of 0 and 608.

FIG. 6(b) shows how the central process determines the initial upper and lower bounds of process $P_2$. Similar steps are performed for each of the other processes. The initial upper and lower bounds are determined by a central process, as follows:

$$\text{initial upper bound} = \text{ceil}(m_j/k^u) = \text{ceil}(32/8) = 4$$

$$\text{initial lower bound} = \text{floor}(m_j/k^u) - P = \text{floor}(32/8) - 4 = 0.$$

Because the 0 th key in the list is 0 (by default) and the $4^{th}$ key in the list sent to the central process by the other processes (after sorting) is 608, the initial upper and lower bounds are 0 and 608, respectively.

FIGS. 7(a) and 7(b) are further diagrams in the example of how process $P_2$ S determines an upper bound of its key. In FIG. 7(a), where u=2, every fourth value is considered (i.e., $2^u=2^2=4$). Process $P_2$ asks for and receives, from the other processes, values between 0 and 608. The nine resulting values are shown in FIG. 7(b). The ranks of the lowest value in each table (where every fourth value is being considered) are:

| Process | low value | rank |
|---------|-----------|------|
| P1 | 308 | 0 |
| P2 | 142 | 0 |
| P3 | 239 | 0 |
| P4 | 233 | 0 |

Thus, the rank of the lower bound is 0+0+0+0+1=1.
Process $P_2$ determines that the position of the upper and lower bounds are:

$$\text{initial upper bound} = \text{ceil}(m_j/k^u) = \text{ceil}(32/4) = 8$$

$$\text{initial lower bound} = \text{floor}(m_j/k^u) - P = \text{floor}(32/4) - 4 = 4.$$

This means that the upper bound key has 8−1=7 values below it on the list of FIG. 7(b). Thus, the upper bound is 590, which has seven values below it on the list. Similarly, the lower bound key has 4−1=3 values below it on the list of FIG. 7(b). Thus, the lower bound is 308, which has three values below it on the list.

FIGS. 8(a) and 8(b) are further diagrams in the example of how a process determines an upper bound of its key. In FIG. 8(a), where u=1, every second value is considered (i.e., $2^u=2^1=2$). (this means that, in this example, where k=2 every value in the Tables Tj will be examined). Process $P_2$ asks for and receives, from the other processes, values between 308 and 590. The ten resulting values are shown in FIG. 8(b). The ranks of the lowest value in each table (where every second value is being considered) are:

| Process | low value | rank |
|---------|-----------|------|
| P1 | 308 | 1 |
| P2 | 332 | 3 |
| P3 | 310 | 2 |
| P4 | 467 | 2 |

Thus, the rank of the lower bound is 1+3+2+2+1=9
Process $P_2$ determines that the position of the upper and lower bounds are:

initial upper bound=ceil($m_j/k^u$)=ceil(32/2)=16 initial lower bound=floor($m_j/k^u$)−P=floor(32/2)−4=12.

This means that the upper bound key has 16−9=7 values below it on the list of FIG. 8(b). Thus, the upper bound is 521, which has seven values below it on the list. Similarly, the lower bound key has 12−9=3 values below it on the list of FIG. 8(b). Thus, the lower bound is 428, which has three values below it on the list.

FIGS. 9(a) and 9(b) are further diagrams in the example of how a process determines an upper bound of its key. In FIG. 9(a), where u=0, every value is considered (i.e., $2^u=2^0=1$). In this example, when u=0, each process must do a disk I/O before responding to a message from other processes. Because table Tj only contains every kth value, the process will have to access its workfile before it can determine which values fall between the upper and lower bounds. The efficiency of the search is preserved because these disk I/Os are for small amounts of data and take relatively small amounts of time. Process $P_2$ asks for and receives, from the other processes, values between 428 and 521. The seven resulting values are shown in FIG. 9(b). The ranks of the lowest value in each table (where every value is being considered) are:

| Process | low value | rank |
|---------|-----------|------|
| P1 | 474 | 5 |
| P2 | 521 | 9 |
| P3 | 428 | 7 |
| P4 | 451 | 4 |

Thus, the rank of the lower bound is 5+9+7+4+1=26
Process $P_2$ is looking for a key having position m=32. Thus, the position of the key with specified rank within the list is:

m−rank of lower bound=32−26=6.

This means that the desired key has 32−26=6 values below it on the list of FIG. 9(b). Thus, the key $k_2$ of rank $m_2$ is 521, which has six values below it on the list. Because this is the last round, the key $k_{j-1}$ (i.e., $K_1$, since k=2) will be obtained from the neighbor process $P_1$. In an alternate embodiment, the RBA can be obtained from an appropriate list of a list of keys.

FIG. 10 is a further diagram in the example of how a process determines its upper bounds, showing that the resulting key 521 is, indeed the m th ($32^{nd}$) key in the data to be sorted. There are 32 keys having values less than or equal to the key 521. Thus, key 521 will be the largest key in the output partition $O_2$ of process $P_2$.

D. Further Discussion of Method a) Basic Method

Assume $\alpha_j = k e n_j$, all j, and let $T_j$ be a subset of $S_j$ consisting of every k-th element, i.e.

$$T_j = \{s_{ik,j}: i = 1, \ldots, n_j\},$$
$$T = \{t_h: h = 1, \ldots, N/k\} = \bigcup\{T_j: j = 1, \ldots, P\}$$

Further assume T has been sorted, so that $t_h < t_h+1$, h<N/k. A basic principle of sorting, adapted to the present formulation, asserts:

(1.0) Let t∈T with rank m in T. Then $$k \cdot m + (k-1) \cdot P \geq r_S(t) \geq k \cdot m$$

Proof: Every member of T is greater than k−1 elements of some $S_j$ uniquely associated with it, and so t has rank at least k·m in S. Suppose t∈$T_j$.
For any j'≠j, let $t_{i,j'}$ be the largest element in $T_{j'}$<t. ps Then t may be greater than at most the k−1 elements of ($t_{i,j'}$, $t_{i+1,j'}$) from $S_{j'}$.
Now note that if $\alpha_j$ is not divisible by k, we may pad $T_j$ (and $S_j$) with k−($\alpha_j$ mod k) values '∞', i.e. keys larger than the maximum, and apply the principle unchanged.
In particular, if S is indexed in sort order,
$t_{q'} \leq s_m \leq t_q$, where $$q'=\lfloor m/k \rfloor - P, \text{ and } q=\lceil m/k \rceil.$$

Thus one can calculate lower and upper bounds for the m-th smallest element of S from the sample T formed by taking every k-th element from each partition $S_j$. This process can be iterated, reducing the cardinality of each successive sample by a factor of k, forming $$T = T^1 \supset T^2 \supset \ldots \supset T^u,$$

until $T^u$ is small enough to sort on a single process. Lower and upper bound intervals ($t_{q'h}$, $t_{qh}$] in $T^h$, 1≤h≤u, are defined with indices:

$$q_h = \lfloor m/k^h \rfloor - P \text{ and } q_h = \lceil m/k^h \rceil.$$

(Note that (1.0) implies
$r_T h-1(t_{qh'}) \leq q_{h-1}$, and $r_T h-1(t_{qh}) \geq q_{h-1}$, i.e. $t_{qh'} \leq t_{qh-1}$ and $t_{qh-1} \leq t_{qh}$.)
When $T^u$ has been sorted, the upper and lower bounds can be broadcast, their ranks in $T^{u-1}$ determined, and the intervening keys transmitted to $p_0$. This interval (of size P·k to 2P·k) in $T^{u-1}$ can now be sorted and the bounds calculated in $T^{u-1}$ located, repeatedly until reaching $T^1$. (The positions within each interval are the computed indices minus the lower bound rank.) The interval ($t_{q'}$, $t_q$] in S contains at most 2P·k members, and can now be sorted to locate $s_m$.
In effect, each iteration reduces the set of 'candidates' for $s_m$ by a factor of k.

In general, if a sort threshold of $2^\beta$ is specified, and $P=2^\gamma$, with $\gamma<\beta$, k can be set to approximately $2^{\beta-\gamma}$. The number of rounds $u+1$ will be $(\log(N)-\gamma)/(\beta-\gamma)=\log(N/P)/\log(k)$, since $N/k^u$ should be small enough to sort.

Regarding the complexity of the number of rounds, one can say:

(i) If there exist $\beta$, $\gamma$ such that one can always sort $N^\beta$ and $P<N_g$, then $u+1=(1-\beta)/(\beta-\gamma)$, i.e. constant. For most instances of the application treated here, one can sort $\sqrt{N}$ keys efficiently in main memory, and P will be $<N^{1/4}$ (or $N^{1/3}$), so 2–4 rounds will suffice.

(ii) If $\gamma=\lceil\log(N/P)\rceil/\lfloor\log\log(N)\rfloor$, $k=2^\gamma$, with a sort threshold of $k\cdot P$, then $u<\log\log(N)$. With a maximum P of $2^{12}$, and $N<2^{40}$, this would require a sort threshold of $2^{18}$ for the largest configuration.

For most values of N and P, a suitable sort threshold will invariably result in fewer than $\log\log(N)$ rounds.

(iii) If P is very large (cf. section E(a)), we require only that $k \geq 4$, and the number of rounds would be $\log(N/P)/2$ for a sort threshold of 4P.

This situation is optimal in the sense that with any system of factors $2^{u_1}, 2^{u_2}, \ldots, 2^{u_n}$, resulting in successive sorts of $2^{u_i} \cdot P$ keys for $i \leq n$, the total amount transmitted/sorted is $$\Sigma 2^{u_i} \cdot P = P \cdot \Sigma 2^{u_i}$$

Since the arithmetic mean is always $\geq$ geometric mean, $$(\Sigma 2^{u_i})/n \geq (\Pi 2^{u_i})^{1/n} = 2^{\Sigma u_i/n}$$

$$\Sigma 2^{u_i} \geq n \cdot 2^{\Sigma u_i/n}.$$

So the total cpu for a given number of rounds n will always be minimal with a fixed factor k, and a fixed sort threshold $k \cdot P$.

If $M = k \cdot P$, the number of sort comparisons would be $(M/2) \cdot \log(P)$, rather than $M \cdot \log(M)$, as i) the input consists of P sorted lists, which can be merged, and ii) $\sim M/2$ keys will precede the required index(es) in sort order, on average, and a tournament sort will terminate at this point.

Linear time (o(M)) selection could also be used in to isolate the lower/upper bounds.

b) An Exemplary Parallel Sort Implementation

Let's assume that each process $p_j$, while producing the sorted partition $S_j$ (which may be stored on disk), creates a memory-resident table or subsample $T_j$, consisting of every k-th key. As above, $T=T^1=\cap\{T_j: j=1, \ldots, P\}$. If we were seeking the median $s_m$, i.e. the P/2-th partitioning key, a method following the above procedure would eventually isolate the interval $(t_{q'}, t_q]$ consisting of P keys in main memory (i.e. T) known to bound the (possibly disk resident) median. The coordinating process (say $p_0$), can broadcast these key values in turn, conducting a binary search for the smallest element among them which is an upper bound for $s_m$, by summing the values $r_{Sj}(x)$ returned, for $x \in (t_{q'}, t_q]$. To determine the exact rank in $S_j$, $p_j$ must:

(1) Conduct a binary search of the memory-resident table $T_j$, locating a single k-element interval in $S_j$, bounded by $(t_{i',j}, t_i+1_j]$, where $r_{Tj}(x)=i'$.

(2) Input the interval and conduct a binary search for x. The exact rank can now be computed, given that $r_{Sj}(t_{i',j})= k \cdot i'-1$.

At most $\log(P)$ accesses transferring k·(record length) bytes are required, and this would therefore be the parallel time.

However:

(2.0) Let c be the cost of a seek and transfer of k records. The total per process expected cost of binary searches for P−1 distinct partitioning elements is $\leq 2(P-1) \cdot c$.

(2.1) The expected parallel time, i.e. maximum among P processes, is $\leq 3(P-1) \cdot c$.

Proof:

A necessary (but not sufficient) condition for $p_j$ to require $v+1$ accesses to complete a binary search is that $T_j$ have at least v points in common with $(t_{q'}, t_q]$, i.e. $|T_j \cup (t_{q'}, t_q]| >= v$. (Recall that the interval consists of consecutive keys in sort order of $T=\cup\{T_j\}$.) If the P items to be searched are uniformly distributed among the partitions $\{S_j\}$, one can regard the assignments as a sequence of Bernoulli trials, with value 1 if the point $\epsilon T_j$, and 0 otherwise, with probability 1/P of 'success'. This is a binomial distribution B(n,k,p), where n=number of trials=P k=no. successes p=1/P, with mean $(\mu)=1$ and variance $(=\sigma^2)=(P-1)/P$.

The searches for P−1 successive partitioning elements can be regarded as independent, and the sum is therefore a binomial distribution with mean=$(P-1) \cdot (np) = (P-1) \cdot (P \cdot (1/P)) = P-1$, and var.=$(P-1) \cdot (np(1-p)) = (P-1) \cdot ((P-1)/P) = (P-1)_2/P$.

If the expected aggregate size of the intersection(s) above is P−1, then $p_j$ must on average require $\leq 2(P-1)$ accesses. (2.1:)

This proposition can be proved in two ways:

(a) For P>21, the distribution of sums above is approximately normal, and we can use this fact to estimate the probability that any P(P−1) trials would result in a value exceeding $\sqrt{P}$ standard deviations ($\sigma$) from the mean P−1 (i.e. $(P-1) + \sqrt{P} \cdot \sigma = 2(P-1)$):

In fact, Prob $(x > \mu + 4\sigma) < 0.99997$.

(b) However, the Chernoff bounds give a more explicit verification:

For a binomial distribution (n trials, prob=p), if m is an integer>np, $\text{Prob}(x \geq m) \leq (np/m)_m \cdot \exp(m-np)$.

Substituting $n=P(P-1)$ and $m=2(P-1)$, with $p=1/P$, this gives $$\text{Prob}(x \geq 2(P-1)) \leq ((P-1))^{2(P-1)} e^{2(P-1)-(P-1)} = (P-1)^{2(P-1)} e^{2(P-1)-(P-1)}$$

$$= 2^{-2(P-1)} e^{(P-1)}$$

$$= (e/4)^{P-1} \quad (\text{approx.} \ (2/3)^{P-1})$$

Suppose

Prob $(x \geq 2(P-1)) < 1/fP$.

Since there are P processes, the probability that at least one has such a sum is $<1/f$. As the bound above is exponentially decreasing, any f will be exceeded for large enough P. Tabulating several values:

| P | f |
|---|---|
| 10 | 30.2 |
| 20 | 1032 |
| 30 | 3.99e + 4 |
| 64 | >5.79e + 8 |
| 128 | >1.58e + 19 |
| 256 | >2.35e + 40 |

We may conclude that there is negligible likelihood that the slowest process's I/O cost is $\geq 3(P-1) \cdot c$.

(Remark on (2.1): The selection of k-th records would be called systematic random sampling in statistical terms. Since all portions of each partition are chosen uniformly, we would expect this probabilistic behavior irrespective of the underlying distribution of the data.)

Once an interval $(t_i, t_{i+1}]$ in S—with endpoints in T—containing the desired key $s_m$ has been found, each process $p_j$ can transmit its interval keys (and the rank of $t_i$) to $p_0$ which now must sort at most P·k keys to locate $s_m$.

Let's assume that k has been set from a sort threshold of P·k. We can now summarize steps for a fully parallel sort partitioning.

(i) Each process $p_j$ constructs $T_j$ of size $\alpha_j/k$ during the final partition sort/merge phase producing $S_j$.

(ii) Each $p_j$ transmits $T''_j$ to $p_0$ after computing the correct number of rounds, and the sorted set $T''$ is created by $p_0$. Using (1.0), lower and upper bounds for each of P−1 partitioning elements $$(s_{m1}, \ldots, s_{mP-1})$$

are calculated and transmitted, with $s_{mj}$ to be located by $p_j$.

(iii) Each $p_j$ coordinates a succession of alternating sorts and upper/lower bound rank determinations, resulting in $(t_{q'j}, t_{qj}]$, as above.

(iv) Each $p_j$ conducts a parallel binary search, requiring at most log(P) transfers of k·(record length) bytes per cpu, and computes $s_{mj}$ following a sort of at most P·k keys.

(The distribution of keys entails several additional steps preparatory to a parallel merge:

(v) Each $p_j$ broadcasts $s_{mj}$ and all processes establish, through a binary search of the input intervals, a list of P−1 relative byte offsets of each key within the local partitions $S_j$.

(vi) The P lists are transmitted to $p_0$, which rearranges the offsets into P lists, and communicates to each $p_j$ the locations of the respective j-th sub-partition(s) for subsequent merge onto the output partition $O_j$.)

c) Example Timing Estimate $$P = 128 = 2^7$$

With a sort threshold of $2^{16} = 64$ k, k would be set to $2^9$.

Hence with $2^{25}$ 32-byte keys per partition (4 GB of 128-byte records), $\alpha_j/k = 2^{16}$, so the memory-resident tables/samples $T_j$ occupy 2 mb each. If each sort is permitted 64 mb, reserving this space is quite feasible. (Of course, the vacated portions of the work file could be utilized as temporary storage.)

The number of rounds is $$[\log (\Sigma \alpha_j) - 7]/\log(k) = [\log (P \cdot 2^{25}) - 7]/9 = 3.$$

Note that the bounds arguments (1.0) do not really depend on the fact that k is constant from round to round, and we may choose to form $T^2$ from every $2^8$-th key from each $T_j$. The resulting 32 k keys are immediately sorted by $p_0$, which determines initial upper and lower bounds for each of the 127 partitioning keys. Each process (i.e. $p_1$–$p_{127}$ in parallel) coordinates two subsequent rounds ((iii)–(iv)(above).

The work of key extraction (of possibly complex multiple sort keys) was performed during the initial partition merge prior to creating T and the sorts, as mentioned, are really P-way merges. An estimate of 500 cpu cycles per record is therefore reasonable for a high-speed offset-value coded tournament sort. For the final I/O-based sort, add 300 cycles/record cpu (key extraction).

We will use also the K20000 time of 332 $\mu$sec per send/receive during the final binary search, and 57 msec/mb for bulk inter-process transfers of sort keys. For I/O, use roughly 11 msec for seek and rotational delay, with a transfer rate of 4 mb/sec.

Total parallel (elapsed) time has as components:

(1) Initial sort by $p_0$ of $T^2$ ($2^{15}$ keys)+($2^{15} \cdot 2^5$ bytes transmitted)+127 upper/lower bound communications (2) Two subsequent sorts ($2^{15}$–$2^{16}$ and $2^9$–$2^{16}$) and send/receives by each $p_j$ (3) 2·(126–127) send/receives associated with sorts for other partitions (4) 127·7(=log(P)) binary search rounds (5) 127·7($2^9 \cdot 2^7$)–byte I/O seeks/transfers+key extraction (6) 128 sends+126–127 receives of partitioning keys (7) 128 lists received and sent (rearranged) by $P_0$ Calculated:

(1) 78 msec+57 msec+41.2 msec (2) (78+156=234 msec)+(57+114=171 msec)

(3) 82.35 msec (4) 288.2 msec (5) 23.47 sec+231 msec (10.05 sec+99 msec from (2.1))

(6) 41.2 msec (7) 41.5 msec

Total: Approximately 24.7 sec. (maximum)

11.2 sec. (expected)

In a recent test, implemented using a Compaq Windows NT cluster, a terabyte of data was sorted in approximately 47 minutes elapsed time. The partitioning, whose timing estimate is described above, consumed approximately 4 seconds.

For the 128 processes, the total amount of data transmitted for 3 sorts over 11.2 sec, 130–509 mb, is well below the expected available system bandwidth for 128 cpus. (Two additional rounds would reduce the total to 5 mb, but the sort cpu cost for $2^{15}$ keys is approximately equal to the cpu message broadcast overhead of one round.)

E. Description of Other Embodiments

While the invention has been described in conjunction with a specific embodiment, it is evident that many alternatives, modifications and variations will be apparent to those skilled in the art in light of the foregoing description.

For example, the initial formulation clearly has no dependency on the equality of the partition sizes $a_j$, nor is there any limitation on the number of output partitions (apart from parallelism) or their sizes. A sequential method would be possible, for multiple partitions per process/process, perhaps with more rounds and smaller memory-resident samples. The timings cited herein would be maintained, for example, with 256 kb samples if P=16.

For variable-length records, the partitioning could be based on the number of keys, but would preferably seek $s_m$ with a pre-specified rank in terms of total bytes, i.e. the smallest key larger than the designated byte count in sort order. For this purpose, $p_j$ can determine $T_j$ via a current cumulative byte count, adding keys at intervals of $\leq$k bytes. The successive samples can be similarly blocked, with the lower bound calculation in terms of the value P·(maximum interval size) at each stage. In general, the combinatorial efficiency would be maintained with any system of weighted ranks. (Cf. (b) below for a detailed formulation.)

a) The General Database Selection/Quantile Problem

Database optimizers may require histograms of key distributions representing percentiles or other quantiles. The provision of a quantile operator as an SQL extension for DSS has been suggested. An efficient technique for multiple selection from unsorted files can be derived from the methods documented above.

Let t represent the parallel read time for a partitioned file. Clearly one cannot select a K-th largest record (or quantile value) faster than t, as each key must be scanned at least once. For large partitions requiring external sorting, however, two passes over the data will be needed, first producing $n_j$ sorted runs, and then merging the runs to create $S_j$. Assuming maximum read/write concurrency, this involves at least time 2t.

Let's suppose the samples $T_j$ are gathered during the first pass, resulting in in-memory tables of every k-th record from all $n_j$ runs. Let $n_r = \Sigma\{n_j: j=1, \ldots, P\}$. The method outlined above can be applied, with lower and upper bounds separated by $n_r$ points rather than P. Albeit with an increased number of rounds (but still well under log(N/P)), one will reach a stage necessitating a binary search over a small subset of each of the $n_r$ runs. (In fact, an optimization may curtail the search and proceed by sorting whenever the input cost is sufficiently small.)

One can apply (2.1) to bound the parallel time at one seek per run (i.e. $n_j$) plus the transfer of 1–3 consecutive intervals. This can be reduced further by parallelizing work file access across multiple devices. The total elapsed time will then not be much larger than t for the computation of P−1 quantiles, with very high probability. (It will be advantageous in this application to utilize larger in-memory tables, no larger than half the sort capacity.)

Assuming for notational convenience that all $n_j$ are equal, one can compute the probabilities of excessive I/O as follows. If the final search for the quantile key has been reduced to $n_r$ intervals, the probability that one of the delimiting points is an element of one of $p_j$'s $n_j$ samples is $n_j/n_r = 1/P$. The binomial distribution has a mean of $n_j$, and (by Chernoff bounds of (2.1))

$$\text{Prob}(x \geq 2 \cdot n_j) < (e/4)^{n_j}$$

for a single search. If we were seeking percentiles, $$\text{Prob}(x \geq 2.99 \times n_j) < (e/4)^{99 \cdot n_j}$$

For the illustration below, for instance, the probability that at least one process requires 3 intervals input per run per quantile is $$< (e/4)^{16252}.$$

For a concrete estimate, using the example with P=128, if each initial run of the 4 GB partitions is 32 mb, $n_j$=128, and $n_r = 2^{14}$.
Increase the size of $T_j$ from 2 mb to 32 mb, so that the disk interval size is reduced to 4 k from 64 k. Using 11 ms/seek and a transfer rate of 4 mb/sec, the parallel I/O cost (utilizing 4 work devices per process) would then be (127 quantiles)·(128 runs)·(1 seek + 3·4k transfer)/4 =

$$16256 \cdot (1.37e - 2 \text{ sec}) \cdot (1/4) = 56 \text{ sec}$$

Since t=4 GB@4 mb/sec=1024 sec, the total elapsed time is close to the parallel read time, as the total per process cpu cost would add approximately 2.5 sec.

In addition to the 32 mb table(s), additional memory required will average, given record length=128, key length=32, and 4 k intervals:

(127 quantiles)·(128 runs)·(2 intervals)·(32 keys/int.)=
16256·2·1024 bytes=31.75 mb Applying the arguments of (2.1), less than 48 mb is assured. Adding approximately 2 mb for sorting, this gives an average total of 66 mb (and <82 mb max), which is no more than would be required to sort the partition(s).

For determination of percentiles or other smaller sets of quantiles, the cpu, I/O and memory costs will be reduced proportionately.

Additionally, one can complete sorts with relatively few runs (say $n_r$<512) using the above technique, eliminating one local merge pass.

b) Formulation for Variable-Length Records

As above, let $\{S_j\}$ represent the sorted partitions, S the (sorted) union, $T^{u_j}$ (respectively $T^u$) the (in-memory) samples, and P the number of partitions.

For $s_{i,j} \in S_j$ let $w_{i,j}$ be the record length or any other weight, $$W = \sum \{w_{i,j}: i \leq n_j, j \leq P\}$$

$w_\mu = W/N$ = average record length $w_{max}$ = maximum length $r(s)$ = rank of $s = \sum \{w_{i,j}: s_{i,j} < s, s_{ij} \in S\}$ $r_j(s)$ = rank of $s$ in $S_j = \sum \{w_{ij}: s_{ij} < s, s_{ij} \in S_j\}$ The selection/partitioning problem is now to determine the largest key in S whose rank does not exceed a given fraction of W, or equivalently exact weight $W_o$.

Form the initial samples $T_j^1$ including keys at intervals of approximately $k \cdot w_m$ bytes, i.e.

$t_{v,j} = s_{\phi j(v),j}$ where $$\Sigma\{w_{ij}: i < \phi_j(v)\} \leq v \cdot k \cdot w_\mu < \Sigma\{w_{ij}: i \leq \phi_j(v)\}$$

Thus the v-th member of $T_j$ is the largest key in $S_j$ with rank at most $v \cdot k \cdot$(mean record length). To insure consecutive elements of the sample are distinct the factor k must satisfy $$k \geq \lceil w_{max}/w_\mu \rceil.$$

An analogue of (1.0) is:

(3.0) If $t_v \in T$, $$v \cdot k \cdot w_\mu + P \cdot k \cdot w_\mu \geq r(t_v) \geq (v-1) \cdot k \cdot w_\mu$$

Proof:

If $t_v \in T$, then for each $j \leq P$ there is an index $v_j \leq n_j$ such that $$\Sigma v_j = v, \text{ and } t_{vj,j} \leq t_v < t_{vj+1,j} j=1, \ldots, P$$

Assume $t_v \in T_1$.
Since $$r_j(t_{vj,j}) \leq v_j k \cdot w_\mu < r_j(t_{vj,j}) + w_{vj,j} \text{ for } j = 1, \ldots, P,$$

$$r(t_v) \geq \sum \{r_j(t_{vj,j}) + w_{vj,j}: j > 1\} + r_1(t_v)$$

$$\geq \sum \{v_j k \cdot w_\mu: j > 1\} + r_1(t_v)$$

$$\geq \sum \{v_j k \cdot w_\mu: j > 1\} + (v_1 k \cdot w_\mu - w_{v_l,1}) \text{ (from def. of } T_j)$$

$$= vk \cdot w_\mu - w_{v_l,1} \geq vk \cdot w_\mu - w_{max}$$

$$\geq (v-1)k \cdot w_\mu \text{ since } k \cdot w_\mu \geq w_{max}$$

On the other hand, for j=1, ..., P, $$r_j(t_{v_j+1,j}) \leq (v_j+1) \cdot k \cdot w_\mu, \quad \text{so}$$

$$r(t_v) \leq \sum \{(v_j+1) \cdot k \cdot w_\mu\}$$
$$= vk \cdot w_\mu + Pk \cdot w_\mu$$

For u>1, k-th element sub-samples can be constructed as in the fixed-length procedure, preserving the property that each key is the smallest whose rank in the partition is less than some multiple $v \cdot k^u$ of the mean record length $w_m$.

Let $m_u = \lceil W_o/w_\mu \rceil$, $m_l = \lfloor W_o/w_\mu \rfloor$

From (3.0), an upper bound for $W_o$ in $T^u$ is $t_{v'}$, with $v' = \lceil m_u/k^u \rceil + 1$ The lower bound adjustment is given by $t_v$, where $v = \lfloor m_l/k^u \rfloor - P$, as in the fixed length method.
Proof:
From (3.0),
$r(t_{v'}) \geq \lceil m_u/k^u \rceil \cdot k^u \cdot w\mu$
$\geq m_u \cdot w\mu$
$\geq W_o$
$r(t_v) \leq (\lfloor m_l/k^u \rfloor - P) \cdot k^u \cdot w\mu + Pk^u \cdot w\mu$
$\leq m_l \cdot w\mu$
$\leq W_o$ Thus we require two additional adjustments: 1) for the imprecision of $W_o$ as a multiple of the mean record length, and 2) for the variable length contribution to upper bound uncertainty.

Proceeding iteratively, when $T^1$ is reached, a binary search among at most 2 k×P+k interval points can be conducted, using record lengths as rank weights. The final sort requires a parallel lower bound rank computation and a running total search in sort order for the partitioning key by the coordinating process.

The blocking factors k and $w_m$ must satisfy the relation $$k \cdot w\mu \geq w_{max}$$

To reduce sort thresholds, i.e. k, $w_m$ can be arbitrarily increased subject to this condition. Gathering W and $w_{max}$ while sorting involves negligible cost, but would be unnecessary when the inequality is assured by a large value of k.

F. Summary

In summary, the partitioning method of the present invention can be used in a number of technical areas. Discussed technical areas include the sorting of large amounts of data and use in determining database quantiles. It is contemplated that the present invention will be used in a distributed processing system, such as a clustered data processing system, although the present invention could also be used in other data processing environments without departing from the spirit and scope of the invention.

In the described parallel sort implementation, each process has a sorted work file containing a portion of the data to be sorted. The processes exchange messages in parallel to determine an upper and a lower bound for each process. These respective upper and lower bounds are then used to determine which data will be written to which output partition O of the various processes. Each process has an output partition O which ends up storing values between the upper and lower bounds of the process.

Accordingly, it is intended to embrace all such alternatives, modifications and variations as fall within the spirit and scope of the appended claims and equivalents.

What is claimed is:

1. A method of parallel sorting a large amount of data, performed by a plurality of processes of the data processing system and comprising:
   providing, for each process, a work file, each work file containing a respective portion of the data to be sorted, where the data within each work file is in sorted order;
   determining an initial upper and lower bound associated with each process;
   sending, by each of the processes in parallel, a plurality of messages to each of the other processes indicating current upper bounds of the sending process to determine an upper bound for the sending process; and
   performing, by the processes, a merge in which each of the processes creates an output partition containing data within its upper and lower bounds.

2. The method of claim 1, wherein the data to be sorted include variable length records.

3. The method of claim 1, wherein a number of processes is equal to a number of processors executing the processes.

4. The method of claim 1, wherein a number of processes is not equal to a number of processors executing the processes.

5. The method of claim 1, wherein the act of providing a work file, for each process includes the step of sorting each work file by the process associated with the work file.

6. The method of claim 1, wherein the act of determining an initial upper and lower bound associated with each process includes sending a subsample of internal memory tables T of each process to a central process and sending, by the central process, the initial upper and lower bounds of each process to each process.

7. The method of claim 1, wherein the act of sending, by each of the processes in parallel, a plurality of messages to each of the other processes includes the steps of:
   determining a number of rounds to be performed by each of the processes:
      for each round, by each of the processes:
         sending a message containing the current upper and lower bounds of the sending process to each of the other processes, and
         receiving from each of the other processes, a message indicating the key values in the internal table of the other process that falls within the sending process's upper and lower bounds and the rank of the lowest of these keys.

8. The method of claim 7, wherein the rank of a given key is the number of keys in a table T less than or equal to the given key.

9. The method of claim 1, wherein the act of merging includes:
   performing, by each process, a series of read accesses from the work files of each of the other processes to read the sections of the work files that fall between the upper and lower bounds of the process performing the read, thus resulting in a merge of the work files.

10. An apparatus of parallel sorting a large amount of data, comprising:
   a software portion configured to provide, for each of a plurality of processes, a work file, each work file containing a respective portion of the data to be sorted, where the data within each work file is in sorted order;

a software portion configured to determine an initial upper and lower bound associated with each process;

a software portion configured to send, by each of the processes in parallel, a plurality of messages to each of the other processes indicating current upper bounds of the sending process to determine an upper bound for the sending process; and a software portion configured to perform, by the processes, a merge in which each of the processes creates an output partition containing data within its upper and lower bounds.

11. The apparatus of claim 10, wherein the data to be sorted include variable length records.

12. The apparatus of claim 10, wherein a number of processes is equal to a number of processes executing the processes.

13. The apparatus of claim 10, wherein a number of processes is not equal to a number of processes executing the processes.

14. The apparatus of claim 10, wherein providing a work file, for each process includes a software portion configured to sort each work file by the process associated with the work file.

15. The apparatus of claim 10, wherein determining an initial upper and lower bound associated with each process includes a software portion configured to send the a sub-sample of internal memory tables T of each process to a central process and a software portion configured to send, by the central process, the initial upper and lower bounds of each process to each process.

16. The apparatus of claim 10, wherein sending, by each of the processes in parallel, a plurality of messages to each of the other processes includes:

a software portion configured to determine a number of rounds to be performed by each of the processes:

for each round, by each of the processes:

a software portion configured to send a message containing the current upper and lower bounds of the sending process to each of the other processes, and a software portion configured to receive from each of the other processes, a message indicating the keys in the internal table of the other process that falls within the sending upper and lower bounds and the rank of the lowest of these keys.

17. The apparatus of claim 16, wherein the rank of a given key is the number of keys in a table T less than or equal to the given key.

18. The apparatus of claim 10, wherein merging includes:

a software portion configured to perform, by each process, a series of read accesses from the work files of each of the other processes to read the sections of the work files that fall between the upper and lower bounds of the process performing the read, thus resulting in a merge of the work files.

19. A computer program product, comprising:

a computer usable medium having computer readable code embodied therein for causing parallel sorting a large amount of data, performed by one of a plurality of processes of the data processing system and including:

computer readable program code devices configured to cause a computer to effect providing, for the process, a work file, the work file containing a respective portion of the data to be sorted, where the data within the work file is in sorted order;

computer readable program code devices configured to cause a computer to effect determining an initial upper and lower bound associated with the process;

computer readable program code devices configured to cause a computer to effect sending, by the process, in parallel with the other processes, a message to each of the other processes indicating current upper bounds of the sending process to determine an upper bound for the sending process; and computer readable program code devices configured to cause a computer to effect performing, by the process, a merge in which the process creates an output partition containing data within its upper and lower bounds.

20. The computer program product of claim 19, wherein the data to be sorted include variable length records.

* * * * *